US012794128B2

(12) United States Patent
Liu et al.

(10) Patent No.: US 12,794,128 B2
(45) Date of Patent: Nov. 10, 2026

(54) ANTENNA

(71) Applicant: MEDIATEK INC., Hsinchu City (TW)

(72) Inventors: Chih-Hsiang Liu, Hsinchu City (TW); Chung-Hsin Chiang, Hsinchu City (TW); Shih-Huang Yeh, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 235 days.

(21) Appl. No.: 18/673,436

(22) Filed: May 24, 2024

(65) Prior Publication Data

US 2024/0413536 A1 Dec. 12, 2024

Related U.S. Application Data

(60) Provisional application No. 63/507,129, filed on Jun. 9, 2023.

(51) Int. Cl.

*H01Q 1/22* (2006.01)
*H01Q 1/48* (2006.01)
*H01Q 9/04* (2006.01)

(52) U.S. Cl.

CPC ......... *H01Q 9/0421* (2013.01); *H01Q 1/2283* (2013.01); *H01Q 1/48* (2013.01)

(58) Field of Classification Search

CPC ........ H01Q 1/2283; H01Q 1/243; H01Q 1/38; H01Q 1/48; H01Q 9/0407–0457; H01Q 21/065; H01Q 23/00

See application file for complete search history.

(56) References Cited

U.S. PATENT DOCUMENTS

| | | | | |
|---|---|---|---|---|
| 8,098,203 | B2 * | 1/2012 | Ueki | H01Q 9/0421 343/846 |
| 11,139,588 | B2 * | 10/2021 | Edwards | H01Q 1/38 |
| 11,424,195 | B2 * | 8/2022 | Shaul | H01Q 1/2283 |
| 11,431,096 | B2 * | 8/2022 | Thyagarajan | H01Q 9/0414 |

FOREIGN PATENT DOCUMENTS

TW M373008 U1 1/2010

* cited by examiner

*Primary Examiner* — Hasan Islam

(74) *Attorney, Agent, or Firm* — McClure, Qualey & Rodack, LLP

(57) ABSTRACT

An antenna and an antenna package are provided. The antenna includes an antenna substrate, an antenna layer, a grounding layer and a first conductive feature. The antenna substrate has a top surface and a bottom surface opposite to the top surface. The antenna layer is disposed on the top surface of the antenna substrate. The grounding layer is disposed on the bottom surface of the antenna substrate. The first conductive feature is embedded in the antenna substrate and close to a first edge of the antenna layer. The first conductive feature and the grounding layer are spaced apart by a part of the antenna substrate. The first conductive feature includes a first portion. The angle between the first portion or an extended line of the first portion and the top surface of the antenna substrate is greater than 0 degrees and less than 180 degrees.

20 Claims, 20 Drawing Sheets

ANTENNA

CROSS REFERENCE TO RELATED APPLICATIONS

This application claims the benefit of U.S. Provisional Application No. 63/507,129, filed on Jun. 9, 2023, the entirety of which is incorporated by reference herein.

BACKGROUND OF THE DISCLOSURE

Field of the Disclosure

The present disclosure relates to an antenna and an antenna package, and, in particular, to a compact antenna and a compact antenna package having increased shunt capacitance.

Description of the Related Art

Antennas are essential components of all modern electronic devices that require radio-frequency functionality, such as smartphones, tablet computers, and notebook computers. As communication standards evolve to provide faster data transfer rates and higher throughput, the demands placed on antennas are becoming more challenging. For example, to meet requirements of fifth-generation (5G) mobile telecommunication at FR2 (Frequency Range 2) bands with MIMO (multi-input multi-output) of dual-polarization diversity, an antenna needs to support broader bandwidths. It also needs to be able to transmit and receive independent signals with different polarizations (e.g., two signals carrying two different data streams by horizontal polarization and vertical polarization) with high signal isolation between these different polarizations, so as to provide high cross-polarization discrimination (XPD).

Moreover, antennas need to be compact in size, since modern electronic devices need to be slim, lightweight, and portable, and these devices have limited space available for an antenna. Accordingly, antennas need to have a high bandwidth-to-volume ratio representing the amount of bandwidth per unit volume (measured in, e.g., Hz/(mm$^3$)). In order to improve communication with high-end smartphone applications, an antenna module with enhanced performance and a small size is desirable.

BRIEF SUMMARY OF THE DISCLOSURE

An embodiment of the present disclosure provides an antenna. The antenna includes an antenna substrate, an antenna layer, a grounding layer and a first conductive feature. The antenna substrate has a top surface and a bottom surface opposite to the top surface. The antenna layer is disposed on the top surface of the antenna substrate. The grounding layer is disposed on the bottom surface of the antenna substrate. The first conductive feature is embedded in the antenna substrate and close to a first edge of the antenna layer. The first conductive feature and the grounding layer are spaced apart by a part of the antenna substrate. The first conductive feature includes a first portion. The angle between the first portion or an extended line of the first portion and the top surface of the antenna substrate is greater than 0 degrees and less than 180 degrees.

An embodiment of the present disclosure provides an antenna package. The antenna package includes an antenna, a first substrate and a semiconductor die. The antenna includes an antenna substrate, an antenna layer, a grounding layer and a first conductive feature. The antenna substrate has a top surface and a bottom surface opposite to the top surface. The antenna layer is disposed on the top surface of the antenna substrate. The grounding layer is disposed on the bottom surface of the antenna substrate. The first conductive feature is embedded in the antenna substrate and close to a first edge of the antenna layer. The first conductive feature and the grounding layer are spaced apart by a part of the antenna substrate. The first conductive feature includes a first portion. The angle between the first portion or an extended line of the first portion and the top surface of the antenna substrate is greater than 0 degrees and less than 180 degrees. The first substrate is mounted on the grounding layer of the antenna. The semiconductor die is mounted on the first substrate.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

Figure 1A:
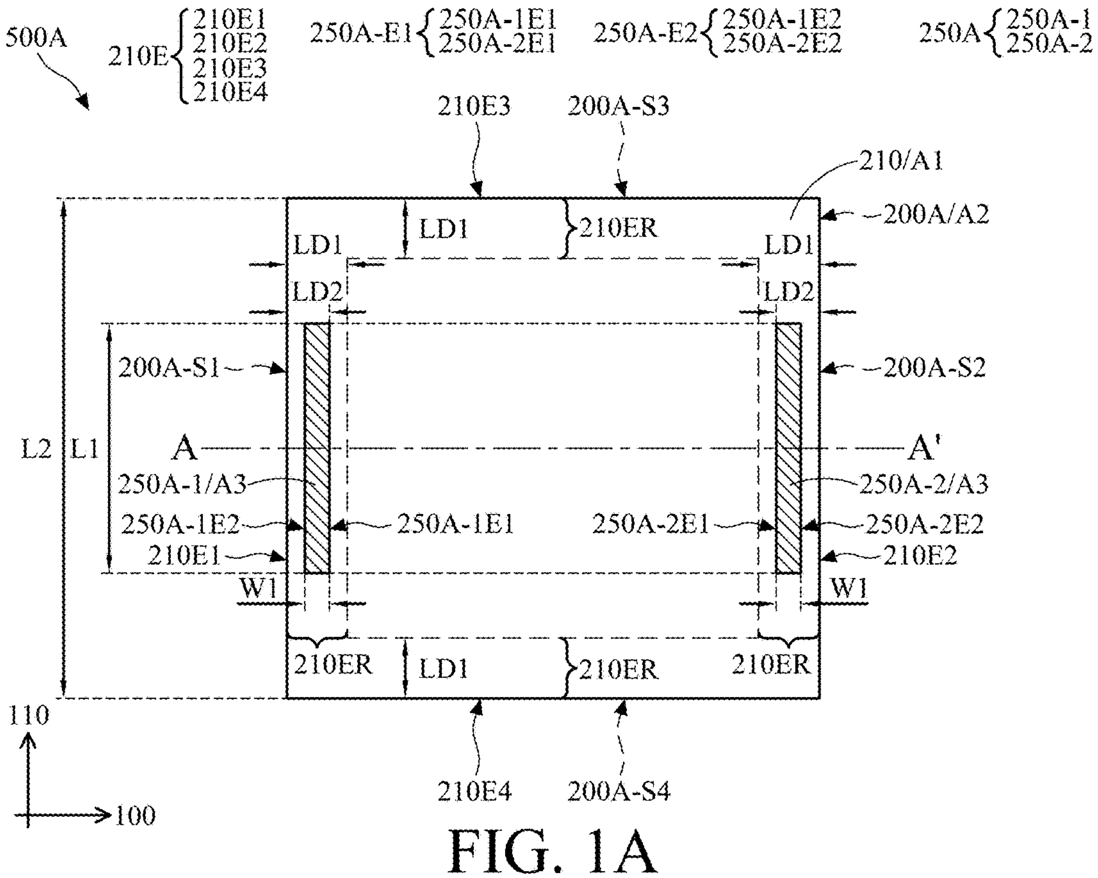
FIG. 1A is a top view of an antenna in accordance with some embodiments of the disclosure.

The following description is made for the purpose of illustrating the general principles of the disclosure and should not be taken in a limiting sense. The scope of the disclosure is best determined by reference to the appended claims.

The inventive concept is described fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted that the inventive concept is not limited to the following exemplary embodiments and may be implemented in various forms. Accordingly, the exemplary embodiments are provided only to disclose the inventive concept and let those skilled in the art know the category of the inventive concept. Also, the drawings as illustrated are only schematic and are non-limiting. In the drawings, the size of some of the elements may be exaggerated for illustrative purposes and not drawn to scale. The dimensions and the relative dimensions do not correspond to actual dimensions in the practice of the disclosure.

In 5G millimeter-wave (mmWave) antenna-in-package (AiP), the area of the grounding layer is continuously reduced to be comparable with the antenna layer. The smaller antenna layer may cause decrease of shunt capacitance of the antenna and increase center frequency fc of the AiP. The operation frequency of the conventional AiP will shift to higher frequency band. Therefore, the operation frequency band of the conventional AiP is narrow. The performance of the conventional AiP is impacted at lower frequency band. Thus, a novel antenna having increased shunt capacitance in a small size is desirable.

Figure 1B:
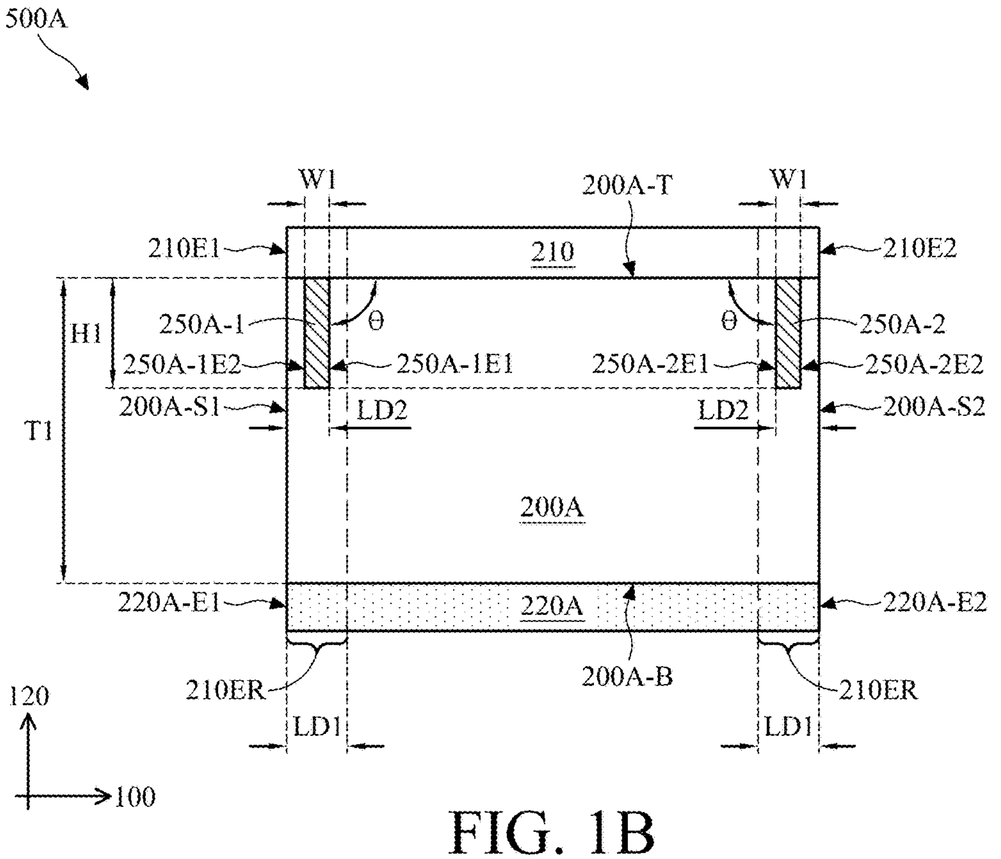
FIGS. 1B, 1C and 1D are cross-sectional views taken along the line A-A' of the antenna shown in FIG. 1A in accordance with some embodiments of the disclosure.
Figure 1C:
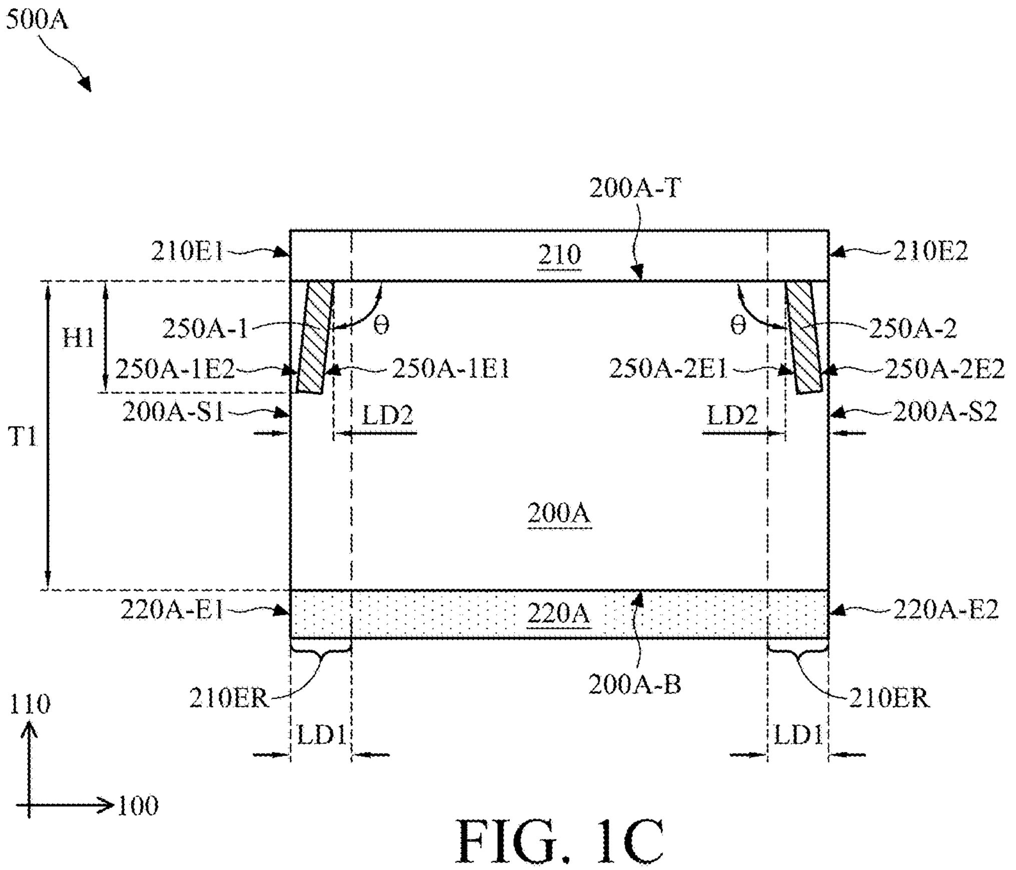
Figure 1D:
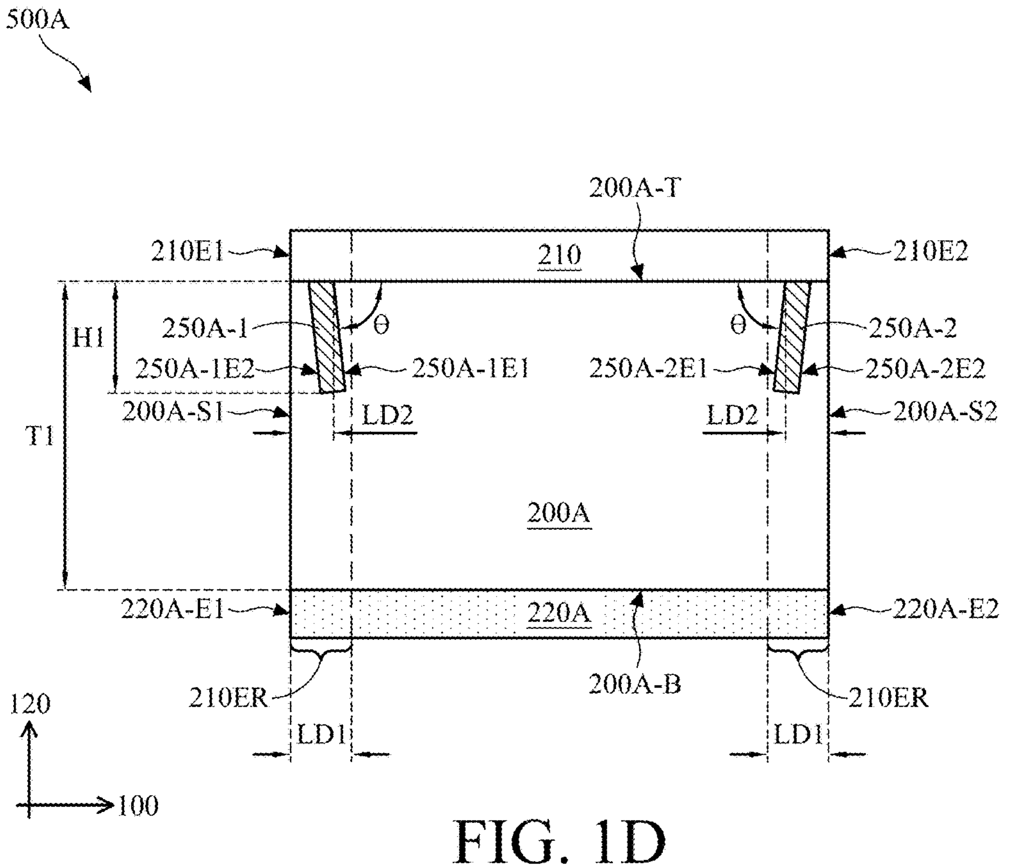

FIG. 1A is a top view of an antenna 500A in accordance with some embodiments of the disclosure. FIGS. 1B, 1C and 1D are cross-sectional views of the antenna 500A shown in FIG. 1A in accordance with some embodiments of the disclosure, showing the arrangement of embedded conductive features of the antenna 500A. In some embodiments as shown in FIGS. 1A and 1B, the antenna 500A (such as an antenna package) includes an antenna substrate 200A, an antenna layer 210, a grounding layer 220A and conductive features 250A (including conductive features 250A-1 and 250A-2). For illustration of the reference directions labeled in the figures, the directions 100 and 110 are defined as the directions (e.g., the lateral direction including the length direction and the width direction) substantially parallel to a top surface 200A-T of the antenna substrate 200A. A direction 120 is defined as the direction (e.g., the vertical direction or the height direction) substantially vertical to the top surface 200A-T of the antenna substrate 200A. The direction 100 is substantially perpendicular to the directions 110 and 120. The direction 110 is substantially perpendicular to the directions 100 and 120. The direction 120 is substantially perpendicular to the directions 100 and 110. For clear illustration of the positions and the geometric dimensions of conductive features of the antenna, the conductive features are drawn in solid line in the following top views (e.g., the conductive features 250A in FIG. 1A).

As shown in FIGS. 1A and 1B, the antenna substrate 200A has a top surface 200A-T, a bottom surface 200A-B, and side surfaces 200A-S1, 200A-S2, 200A-S3, 200A-S4. In the cross-sectional view as shown in FIG. 1B, the side surfaces 200A-S1, 200A-S2, 200A-S3, 200A-S4 are adjacent to and between the top surface 200A-T and the bottom surface 200A-B. In the top view as shown in FIG. 1A, the opposite side surfaces 200A-S1, 200A-S2 are connected between the opposite side surfaces 200A-S3, 200A-S4. In some embodiments, the antenna substrate 200A may be single-layered structure or multi-layered structure. The antenna substrate 200A may be composed of one or more stacked (laminated) dielectric layers. In some embodiments in which the antenna substrate 200A is composed of multiple dielectric layers, the dielectric layers may be made by same or different materials and having same or different thicknesses. In some embodiments, the antenna substrate 200A includes a core substrate and/or a coreless substrate. For example, the antenna substrate 200A may include a core substrate having dielectric layers stacked on opposite sides of the core substrate. For example, the antenna substrate 200A may include a coreless substrate having dielectric layers stacked on one side of the coreless substrate. In some embodiments, the antenna substrate 200A is made of a material including an organic material or an inorganic material, such as FR4 material, FR5 material, bismaleimide triazine (BT) resin material, glass, ceramic, molding compound, liquid crystal polymer, glass cloth based material, epoxy resin, ferrite, silicon, another applicable material or a combination thereof. In some embodiments, the antenna substrate 200A further includes electrical routings (not shown) composed of conductive layers and vias (not shown) formed in the dielectric substrate 200 for electrical connections.

The antenna layer 210 is disposed on the top surface 200A-T of the antenna substrate 200A. In some embodiments as shown in FIGS. 1A and 1B, the antenna layer 210 completely covers the top surface 200A-T of the antenna substrate 200A. In the top view as shown in FIG. 1A, a top view area A1 of the antenna layer 210 is the same as a top view area A2 of the antenna substrate 200A. In some embodiments, the antenna layer 210 may have at least one edge 210E (including edges 210E1, 210E2, 210E3 and 210E4) close to the corresponding side surface of the antenna substrate 200A. For example, in the cross-sectional view as shown in FIGS. 1A and 1B, the antenna layer 210 may have the edges 210E1, 210E2, 210E3 and 210E4 close to and aligned with the corresponding side surfaces 200A-S1, 200A-S2, 200A-S3 and 200A-S4 of the antenna substrate 200A. In some embodiments, at least one of the edges 210E1, 210E2, 210E3 and 210E4 is higher or lower than the corresponding side surface of the antenna substrate 200A, to provide flexibility of the antenna design.

In some embodiments, the antenna layer 210 may be single-layered structure or multi-layered structure. In some embodiments in which the antenna layer 210 is single-layered structure, the antenna layer 210 may be formed on the top surface 200A-T of the antenna substrate 200A. In some embodiments in which the antenna layer 210 is multi-layered structure the antenna layer 210 may be formed on the top surface 200A-T and in the dielectric layers (not shown) below the top surface 200A-T of the antenna substrate 200A. In some embodiments, the antenna layer 210 are a broadside antenna including a patch antenna, a dipole antenna, and a slot antenna, which means the antenna layer 210 may radiate signals alone the direction 120. In some embodiments, the antenna layer 210 may be a boresight antenna, which means the antenna layer 210 may radiate signals along the direction 120. In some embodiments, the antenna layer 210 may be a dual-band or multi-band antenna which can operate in at least a first frequency band and a second frequency band that is different from the first frequency band. For example, the first frequency band has a first frequency range and the second frequency band has a second frequency range that is higher than the first range. For example, the first frequency band could be a low frequency band between 24.25-29.5 GHz, and the second frequency band could be a high frequency band between 37-43.5 GHz, 47.2-48.2 GHz or/and 57-64 GHz. In some embodiments, the antenna layer 210 may be electrically connected to the electrical routings (not shown) in the antenna substrate 200A.

The grounding layer 220A is disposed on the bottom surface 200A-B of the antenna substrate 200A. As shown in FIG. 1B, the grounding layer 220A is disposed below the antenna layer 210. In some embodiments, the grounding layer 220A may be also formed between the dielectric layers (not shown) of the antenna substrate 200A and separated from the antenna layer 210.

In some embodiments, the grounding layer 220A is exposed from the side surfaces 200A-S1, 200A-S2 of the antenna substrate 200A. For example, as shown in FIG. 1B, opposite edges 220A-E1, 220A-E2 of the grounding layer 220A may be aligned with the corresponding side surfaces 200A-S1, 200A-S2 of the antenna substrate 200A. In some embodiments, the grounding layer 220A is formed inside the antenna substrate 200A and is not exposed from the side surfaces 200A-S1, 200A-S2 of the antenna substrate 200A. In some embodiments, the grounding layer 220A may be isolated from the antenna layer 210. In some embodiments, the grounding layer 220A may be made of a metal including, for example, aluminum, copper, gold, silver, iron or a combination thereof.

As shown in FIGS. 1A and 1B, the conductive features 250A (including the conductive features 250A-1 and 250A-2) of the antenna 500A are formed embedded in the antenna substrate 200A. The conductive features 250A-1 and 250A-2 of the antenna 500A are located close to the top surface 200A-T of the antenna substrate 200A and the antenna layer 210. In some embodiments, the conductive features 250A of the antenna 500A is formed close to the corresponding edges 210E1, 210E2 of the antenna layer 210. For example, the conductive feature 250A-1 is formed embedded in the antenna substrate 200A and close to the corresponding edge 210E1 of the antenna layer 210. The conductive feature 250A-2 is formed embedded in the antenna substrate 200A and close to the corresponding edge 210E2 of the antenna layer 210. In the top view as shown in FIG. 1A, a top view area A3 of the conductive feature 250A-1 (or the conductive feature 250A-2) is less than the top view area A1 of the antenna layer 210. In the top view as shown in FIG. 1A and in the cross-sectional view as shown in FIG. 1B, the conductive features 250A may be strip shape. In some embodiments, each of the conductive features 250A may comprise a first portion that extends between the top surface 200A-T and the bottom surface 200A-B. In some embodiments, each of the conductive features 250A may only have the first portion, such as the embodiment of FIGS. 1A and 1B. In some embodiments, each of the conductive features 250A may further comprise a second portion, and the extending direction of the second portion may be different from the extending direction of the first portion. In some embodiments, each of the conductive features 250A may have the same configuration, including aspects such as height, width, shape, or other characteristics. Alternatively, at least two of the conductive features 250A may have different configurations with variations in height, width, shape, or other characteristics.

The conductive features 250A-2 is formed embedded in the antenna substrate 200A and close to the corresponding edge 210E2 of the antenna layer 210. For example, the conductive features 250A-1 and the conductive features 250A-2 are separated from each other. In some embodiments, the conductive features 250A-1 and the conductive features 250A-2 are formed inside the antenna substrate 200A and are not exposed from the corresponding side surfaces 200A-S1, 200A-S2 of the antenna substrate 200A. In some embodiments, the conductive features 250A-1 and the conductive features 250A-2 are exposed from the corresponding side surfaces 200A-S1, 200A-S2 of the antenna substrate 200A.

In some embodiments, the conductive features 250A are electrically connected to the antenna layer 210. For example, the conductive features 250A-1 may be in contact with a portion of the antenna layer 210 close to the corresponding edge 210E1. The conductive features 250A-2 may be in contact with a portion of the antenna layer 210 close to the corresponding edge 210E2. In some embodiments, the conductive features 250A may be isolated from the grounding layer 220.

As shown in FIGS. 1A and 1B, the conductive features 250A are disposed between the antenna layer 210 and the grounding layer 220. The conductive features 250A and the grounding layer 220A are spaced apart by a part of the antenna substrate 200A. In the top view as shown in FIG. 1A, the conductive features 250A-1, 250A-2 may extend along the corresponding edges 210E1, 210E2 of the antenna layer 210. In addition, each of the conductive features 250A is a single wall structure continuously extending parallel to the corresponding edge 210E of the antenna layer 210. For example, the conductive feature 250A-1 may extend along the corresponding edge 210E1 of the antenna layer 210. In addition, the conductive feature 250A-1 is a single wall structure continuously extending parallel to the corresponding edge 210E1 of the antenna layer 210. The conductive feature 250A-2 may extend along the corresponding edge 210E2 of the antenna layer 210. In addition, the conductive feature 250A-2 is a single wall structure continuously extending parallel to the corresponding edge 210E2 of the antenna layer 210. In the top view as shown in FIG. 1A, the conductive features 250A-1, 250A-2 may have a length L1 along the corresponding edges 210E1, 210E2 having a length L2. For example, the antenna layer 210 may be square shape in the top view as shown in FIG. 1A, and the edges 210E1, 210E2, 210E3 and 210E4 have the same length L2. In some embodiments, the length L1 may be less than or equal to the length L2.

In the cross-sectional view as shown in FIG. 1B, the conductive features 250A may extend toward the grounding layer 220. In some embodiments, the conductive features 250A may serve as an extended portion of the antenna layer 210. The conductive features 250A may help to reduce the distance between the antenna layer 210 and the grounding layer 220. Therefore, shunt capacitance of the antenna 500A is increased. The performance of the antenna at lower frequency band can be improved obviously.

As shown in FIG. 1B, the conductive features 250A may have a height H1 along the direction 120. In some embodiments, the height H1 of the conductive features 250A is less than a thickness T1 (i.e., a distance between the top surface 200A-T and the bottom surface 200A-B of the antenna substrate 200A) of the antenna substrate 200A along the direction 120. If the height H1 of the conductive features 250A is equal to the thickness T1 of the antenna substrate 200A, the conductive features 250A may be in contact with both the grounding layer 220A and the antenna layer 210. The performance of the antenna 500A at the lower frequency band is impacted.

In the top view as shown in FIG. 1A, the conductive features 250A may be arranged within an edge region 210ER of the antenna layer 210. In some embodiments, the edge region 210ER may extend from the edges 210E into a portion of the antenna layer 210 by a lateral distance LD1. In some embodiments, the lateral distance LD1 may be less than or equal to 0.1 λg, wherein λg is the guided wavelength of 50Ω microstrip at the center frequency.

As shown in FIGS. 1A and 1B, the conductive features 250A may have inner edges 250A-E1 (including inner edges 250A-1E1, 250A-2E1) away from the corresponding edges 210E of the antenna layer 210 and outer edges 250A-E2 (including outer edges 250A-1E2, 250A-2E2) close to the corresponding edges 210E of the antenna layer 210 and opposite the inner edges 250A-E1. For example, the conductive feature 250A-1 has an inner edge 250A-1E1 away from the corresponding edges 210E of the antenna layer 210 and an outer edge 250A-1E2 close to the corresponding edges 210E of the antenna layer 210. The conductive feature 250A-2 has an inner edge 250A-2E1 away from the corresponding edges 210E of the antenna layer 210 and an outer edge 250A-2E2 close to the corresponding edges 210E of the antenna layer 210. In some embodiments, a lateral distance LD2 between the inner edges 250A-E1 of the conductive features 250A and the corresponding edges 210E of the antenna layer 210 may be less than or equal to 0.1 λg, wherein λg is the guided wavelength of 50Ω microstrip at the center frequency. In some embodiments, a lateral distance LD2 may be less than or equal to the lateral distance LD1. In some embodiments, the outer edge 250A-1E2 of the conductive feature 250A-1 may be flush with or lower than the edge 210E1 of the antenna layer 210 in the direction 100. In some embodiments, the outer edge 250A-2E2 of the conductive feature 250A-2 may be flush with or lower than the edge 210E2 of the antenna layer 210 in the direction 100. In some embodiments, the outer edge 250A-1E2 of the conductive feature 250A-1 may be flush with or lower than the side surface 200A-S1 of the antenna substrate 200A in the direction 100. In some embodiments, the outer edge 250A-2E2 of the conductive feature 250A-2 may be flush with or lower than the side surface 200A-S2 of antenna substrate 200A in the direction 100.

In some embodiments, the conductive features 250A may have a width W1 between the inner edges 250A-E1 and the outer edges 250A-E2. In some embodiments, the width W1 may be less than or equal to 0.1 λg, wherein λg is the guided wavelength of 50Ω microstrip at the center frequency. In some embodiments, the width W1 may be less than or equal to the lateral distance LD1 and/or the lateral distance LD2.

In some embodiments, an angle between the conductive features 250A and the top surface 200A-T of the antenna substrate 200A is greater than 0 degrees and less than 180 degrees. In some embodiments as shown in FIG. 1B, an angle θ between the inner edge 250A-1E1 of the conductive features 250A-1 and the top surface 200A-T of the antenna substrate 200A (or between the inner edge 250A-2E1 of the conductive features 250A-2 and the top surface 200A-T of the antenna substrate 200A) may be a right angle (i.e., the angle θ is equal to 90 degrees). In some embodiments as shown in FIG. 1C, the angle θ between the inner edge 250A-1E1 of the conductive features 250A-1 and the top surface 200A-T of the antenna substrate 200A (or between the inner edge 250A-2E1 of the conductive features 250A-2 and the top surface 200A-T of the antenna substrate 200A) may be an obtuse angle (i.e., the angle θ is greater than 90 degrees and less than 180 degrees). In some embodiments as shown in FIG. 1D, the angle θ between the inner edge 250A-1E1 of the conductive features 250A-1 and the top surface 200A-T of the antenna substrate 200A (or between the inner edge 250A-2E1 of the conductive features 250A-2 and the top surface 200A-T of the antenna substrate 200A) may be an acute angle (i.e., the angle θ is greater than 0 degrees and less than 90 degrees).

In some embodiments, the antenna layer of the antenna may partially cover the top surface of the antenna substrate. In some embodiments, the conductive feature(s) may be formed inside the antenna substrate and are not exposed from the corresponding side surface of the antenna substrate.

Figure 2A:
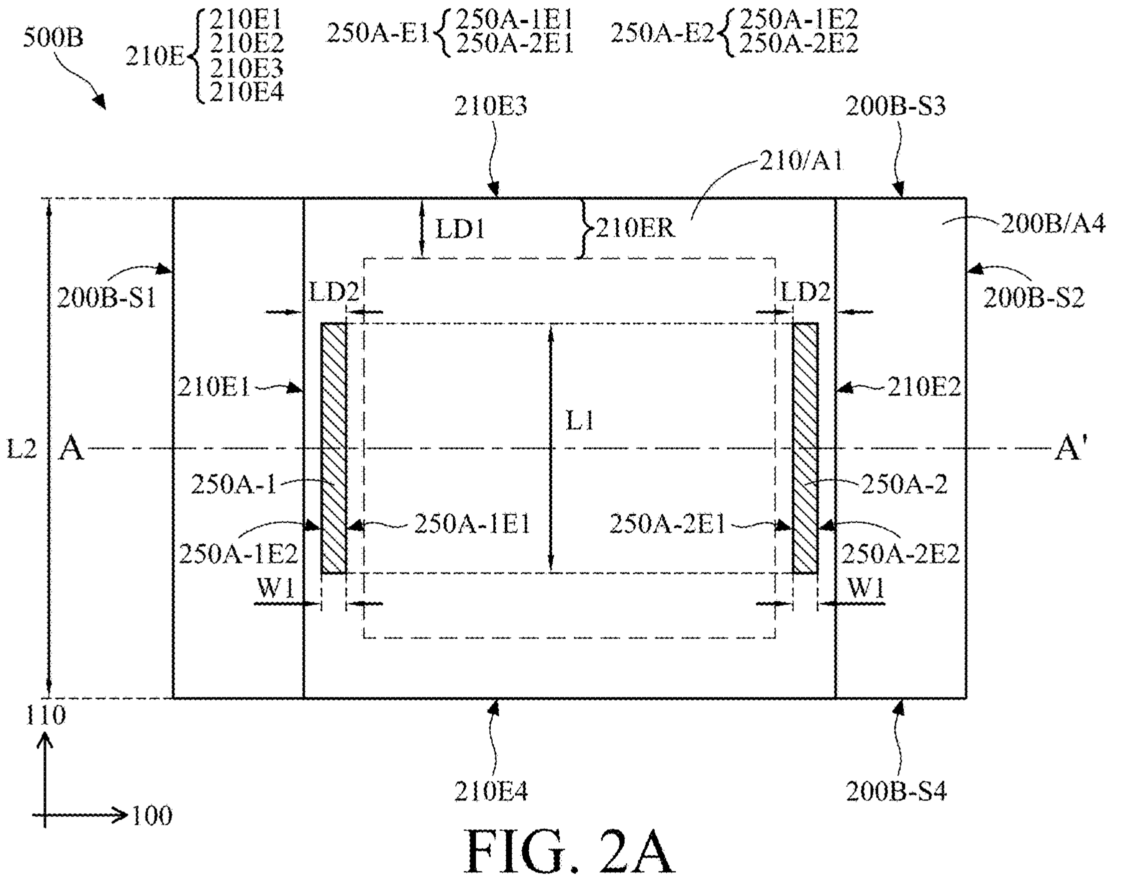
FIG. 2A is a top view of an antenna in accordance with some embodiments of the disclosure.
Figure 2B:
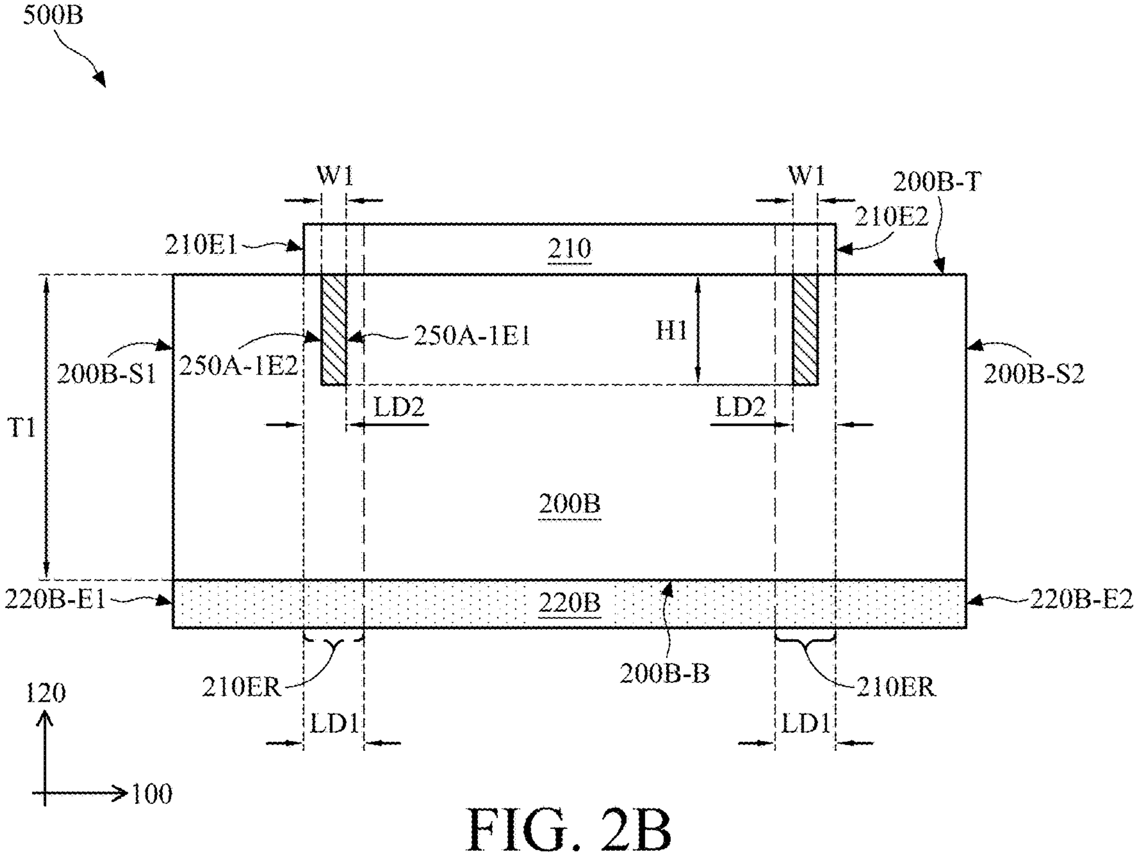
FIG. 2B is a cross-sectional view taken along the line A-A' of the antenna shown in FIG. 2A in accordance with some embodiments of the disclosure.

FIG. 2A is a top view of an antenna 500B in accordance with some embodiments of the disclosure. FIG. 2B is a cross-sectional view taken along the line A-A' of the antenna 500B shown in FIG. 2A in accordance with some embodiments of the disclosure, showing the arrangement of embedded conductive feature of the antenna 500B. Elements of the embodiments hereinafter, that are the same or similar as those previously described with reference to FIGS. 1A and 1B, are not repeated for brevity. As shown in FIGS. 2A and 2B, the difference between the antenna 500B and the antenna 500A is that the antenna 500B includes an antenna substrate 200B and a grounding layer 220B. The antenna substrate 200B has a top surface 200B-T, a bottom surface 200B-B, and side surfaces 200B-S1, 200B-S2, 200B-S3 and 200B-S4. In the cross-sectional view as shown in FIG. 2B, the side surfaces 200B-S1, 200B-S2, 200B-S3, 200B-S4 are adjacent to and between the top surface 200B-T and the bottom surface 200B-B. In the top view as shown in FIG. 2A, the opposite side surfaces 200B-S1, 200B-S2 are connected between the opposite side surfaces 200B-S3, 200B-S4.

As shown in FIGS. 2A and 2B, the antenna layer 210 of the antenna 500B partially covers the top surface 200B-T of the antenna substrate 200B. A portion of the top surface 200B-T that is close to the side surfaces 200B-S1, 200B-S2 of the antenna substrate 200B is exposed from the antenna layer 210. In the top view as shown in FIG. 2A, the top view area A1 of the antenna layer 210 is smaller as a top view area A4 of the antenna substrate 200B. As shown in FIGS. 2A and 2B, projections of the edges 210E1 and 210E2 of the antenna layer 210 on the top surface 200B-T of the antenna substrate 200B may be between the corresponding side surfaces 200B-S1 and 200B-S2 of the antenna substrate 200B. In addition, the edges 210E3 and 210E4 of the antenna layer 210 may be close to and aligned with the corresponding side surfaces 200B-S3 and 200B-S4 of the antenna substrate 200B. In some embodiments, the conductive features 250A-1 and the conductive features 250A-2 are formed inside the antenna substrate 200B and are not exposed from the corresponding side surfaces 200B-S1, 200B-S2 of the antenna substrate 200B. In some embodiments, the outer edge 250A-1E2 of the conductive feature 250A-1 may be flush with or lower than the edge 210E1 of the antenna layer 210 in the direction 100. In some embodiments, the outer edge 250A-2E2 of the conductive feature 250A-2 may be flush with or lower than the edge 210E2 of the antenna layer 210 in the direction 100. In some embodiments, the outer edge 250A-1E2 of the conductive feature 250A-1 may be lower than the side surface 200A-S1 of the antenna substrate 200A in the direction 100. In some embodiments, the outer edge 250A-2E2 of the conductive feature 250A-2 may be lower than the side surface 200A-S2 of antenna substrate 200A in the direction 100.

As shown in FIGS. 2A and 2B, the grounding layer 220B of the antenna 500B is disposed on and covers the bottom surface 200B-B of the antenna substrate 200B. As shown in FIG. 2B, opposite edges 220B-E1, 220B-E2 of the grounding layer 220B may be aligned with the corresponding side surfaces 200B-S1, 200B-S2 of the antenna substrate 200B. In some embodiments, projections of the edges 210E1 and 210E2 of the antenna layer 210 on the grounding layer 220B may be between the corresponding edges 220B-E1, 220B-E2 of the grounding layer 220B.

In some embodiments, one or more conductive features may be arranged close to one or more corresponding edges of the antenna layer. In some embodiments, the conductive features include a single wall structure continuously extends parallel to the corresponding edge of the antenna layer. The number of the conductive features having the single wall structure may be less than or equal to the number of the edges of the antenna layer. In some embodiments, the conductive feature having the single wall structure and the corresponding edge of the antenna layer may be in a one-to-one relationship. In some embodiments, the conductive features having the single wall structure have the same or different heights along the first direction substantially perpendicular to the top surface of the antenna substrate in a cross-sectional view.

In some embodiments, the conductive feature includes discrete wall structures arranged side-by-side and close to the corresponding edge of the antenna layer. In some embodiments, the discrete wall structures are separated from each other and arranged in a row (or arranged in an array of 1×m, wherein m is an integer equal to or greater than one) along the corresponding edge of the antenna layer. In some embodiments, the discrete wall structures and the corresponding edge of the antenna layer may be in a many-to-one relationship. In some embodiments in which the conductive feature includes discrete wall structures, the discrete wall structures have the same or different heights along the first direction in a cross-sectional view.

Figure 3A:
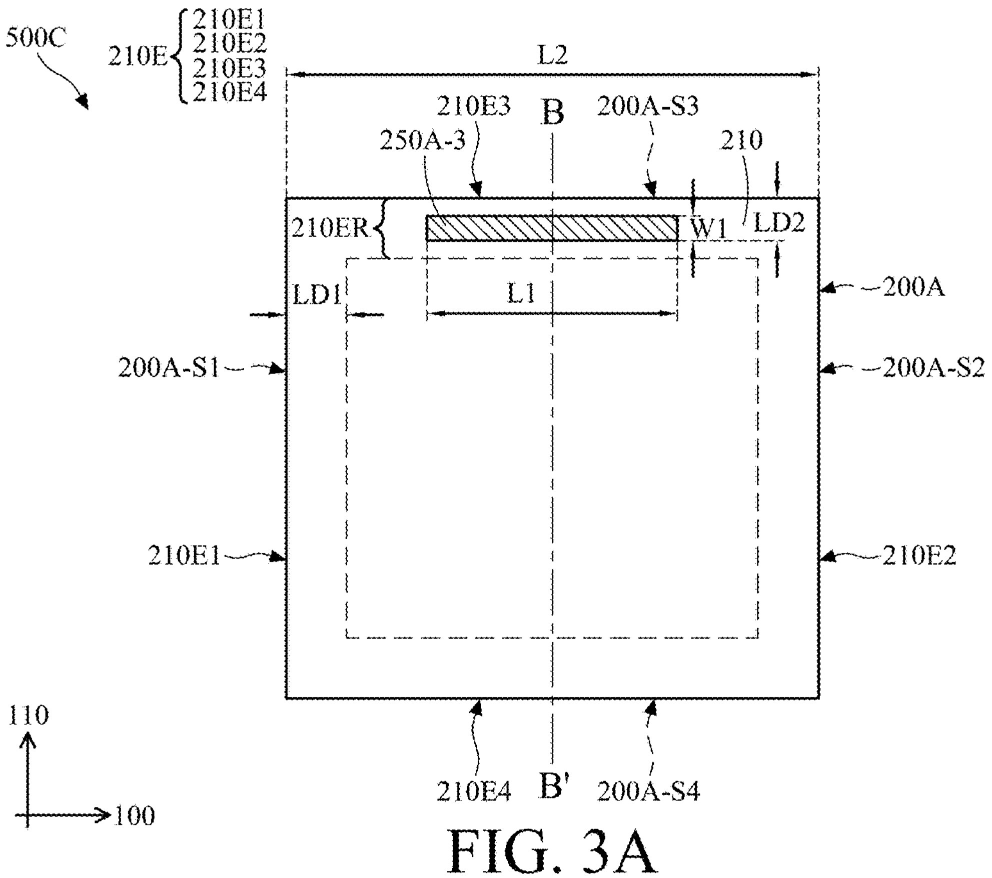
FIG. 3A is a top view of an antenna in accordance with some embodiments of the disclosure.
Figure 3B:
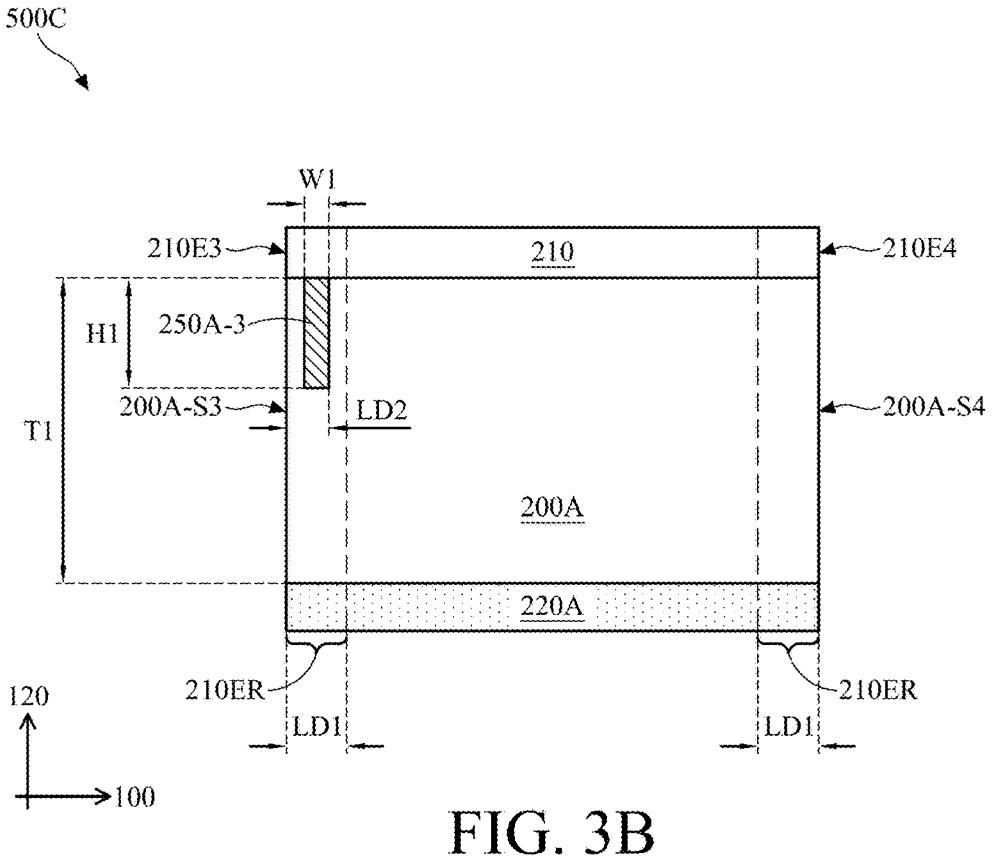
FIG. 3B is a cross-sectional view taken along the line B-B' of the antenna shown in FIG. 3A in accordance with some embodiments of the disclosure.

FIG. 3A is a top view of an antenna 500C in accordance with some embodiments of the disclosure. FIG. 3B is a cross-sectional view taken along the line B-B' of the antenna 500C shown in FIG. 3A in accordance with some embodiments of the disclosure, showing the arrangement of embedded conductive feature of the antenna 500C. Elements of the embodiments hereinafter, that are the same or similar as those previously described with reference to FIGS. 1A, and 1B, are not repeated for brevity. As shown in FIGS. 3A and 3B, the difference between the antenna 500C and the antenna 500A is that the antenna 500C includes a single conductive feature 250A-3 embedded in the antenna substrate 200A and close to the single corresponding edge 210E3 of the antenna layer 210. Similar to the conductive features 250A-1 and 250A-2 as shown in FIGS. 1A and 1B, the conductive feature 250A-3 may include a single wall structure continuously extends parallel to the corresponding edge 210E3 of the antenna layer 210. The number of the conductive feature 250A-3 (i.e., one) having the single wall structure may be less than the number of the edges 210E (i.e., four) of the antenna layer 210. In some embodiments, the conductive feature 250A-3 having the single wall structure and the corresponding edge 210E3 of the antenna layer 210 may be in a one-to-one relationship. In some embodiments, the conductive feature 250A-3 is formed inside the antenna substrate 200A and is not exposed from the corresponding side surface 200A-S3 of the antenna substrate 200A. In some embodiments, the conductive feature 250A-3 is exposed from the corresponding side surface 200A-S3 of the antenna substrate 200A. In some embodiments, the conductive features 250A-1, 250A-2 and 250A-3 may have the same or similar structure (e.g., a single wall structure), length (e.g., the length L1), width (e.g., the width W1) and height (e.g., the height H1).

Figure 4A:
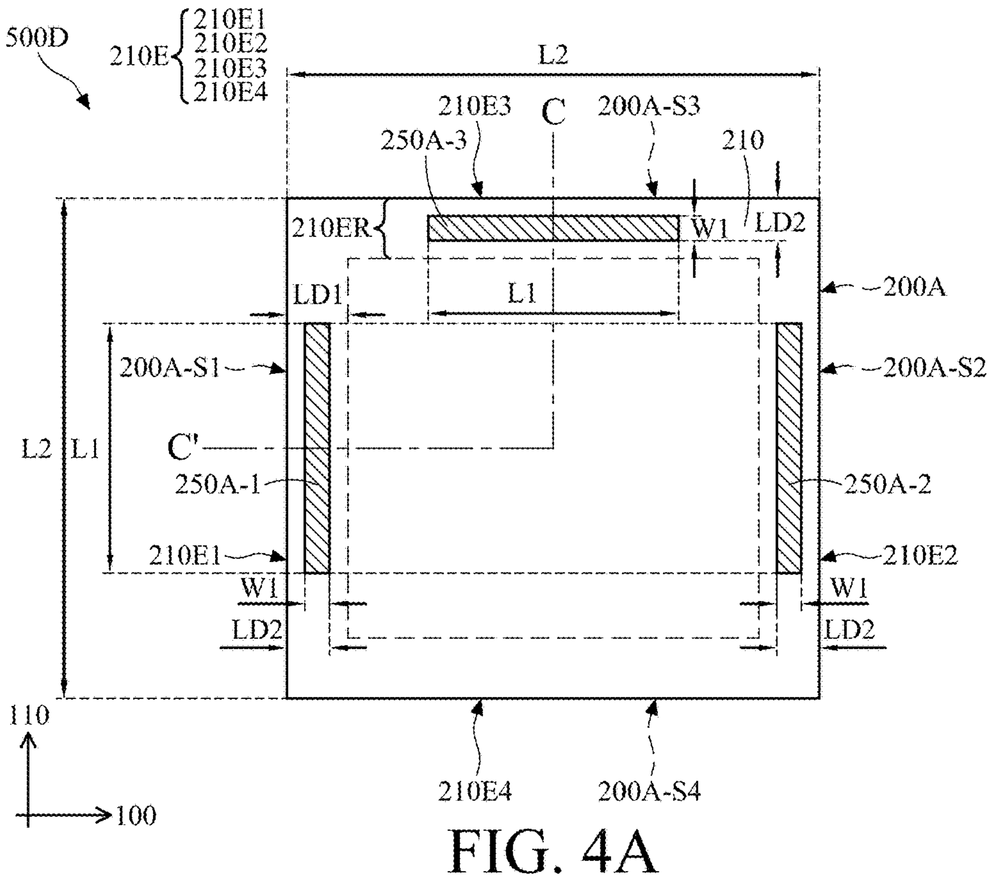
FIG. 4A is a top view of an antenna in accordance with some embodiments of the disclosure.
Figure 4B:
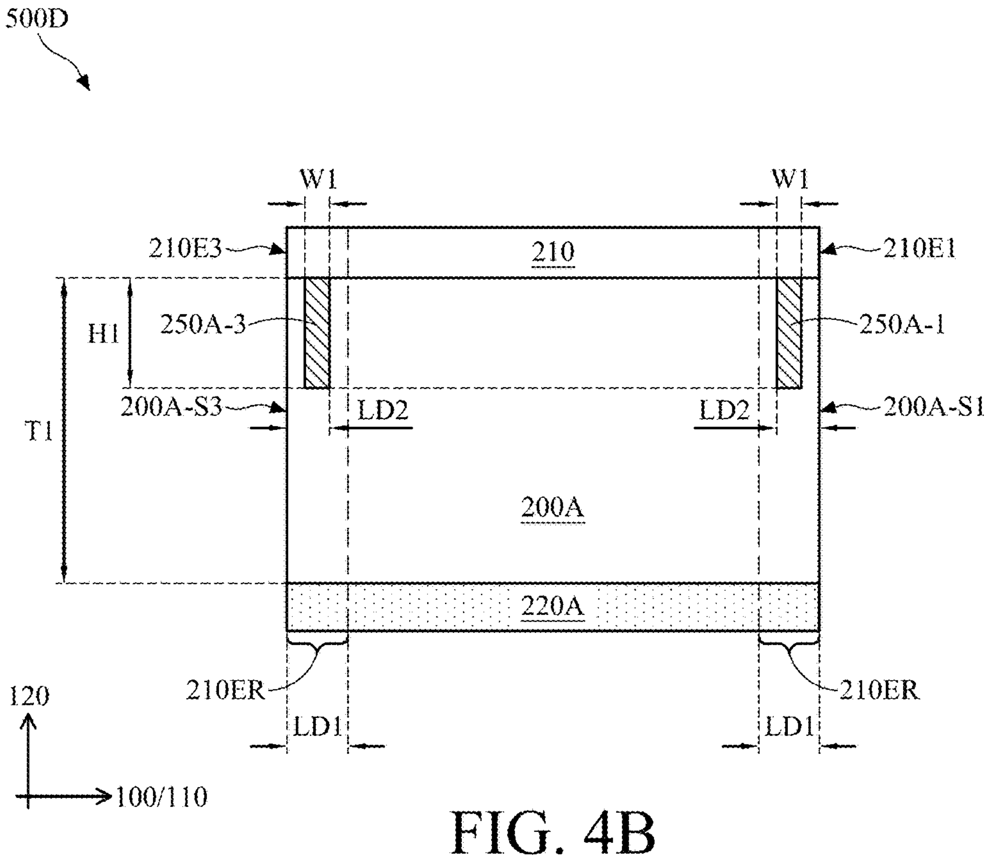
FIG. 4B is a cross-sectional view taken along the line C-C' of the antenna shown in FIG. 4A in accordance with some embodiments of the disclosure.

FIG. 4A is a top view of an antenna 500D in accordance with some embodiments of the disclosure. FIG. 4B is a cross-sectional view taken along the line C-C' of the antenna 500D shown in FIG. 4A in accordance with some embodiments of the disclosure, showing the arrangement of embedded conductive feature of the antenna 500D. Elements of the embodiments hereinafter, that are the same or similar as those previously described with reference to FIGS. 1A, and 1B, are not repeated for brevity. As shown in FIGS. 4A and 4B, the difference between the antenna 500D and the antenna 500A is that the antenna 500D includes three conductive features 250A-1, 250A-2 and 250A-3 embedded in the antenna substrate 200A and close to the three corresponding edges 210E1, 210E2 and 210E3 of the antenna layer 210. The number of the conductive features 250A-1, 250A-2 and 250A-3 (i.e., three) having the single wall structure may be less than the number of the edges 210E (i.e., four) of the antenna layer 210. In some embodiments, the conductive features 250A-1, 250A-2 and 250A-3 having the single wall structure and the corresponding edges 210E1, 210E2 and 210E3 of the antenna layer 210 may be in a one-to-one relationship. In some embodiments, the conductive feature 250A-1, 250A-2 and 250A-3 are formed inside the antenna substrate 200A and are not exposed from the corresponding side surfaces 200A-S1, 200A-S2 and 200A-S3 of the antenna substrate 200A. In some embodiments, the conductive features 250A-1, 250A-2 and 250A-3 are exposed from the corresponding side surfaces 200A-S1, 200A-S2 and 200A-S3 of the antenna substrate 200A. In some embodiments, the conductive features 250A-1, 250A-2 and 250A-3 may have the same or similar structure (e.g., a single wall structure), geometric dimension (e.g., the shape, the length L1, the width W1 and the height H1) and position relative to the antenna layer 210 and the antenna substrate 200A.

In some other embodiments, the antenna 500D may further include an additional conductive feature having the single wall structure corresponding to the edge 210E4 of the antenna layer 210. Therefore, the number of the conductive features (i.e., four) may be the same as the number of the edges 210E (i.e., four) of the antenna layer 210.

Figure 5A:
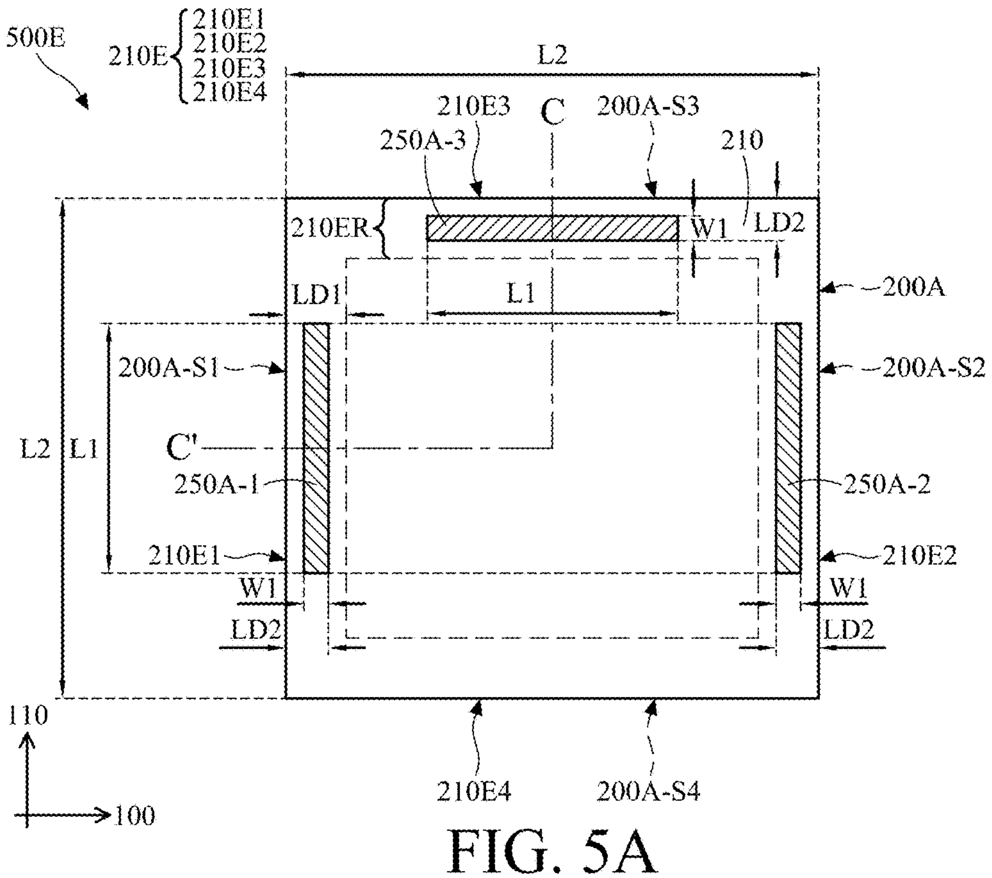
FIG. 5A is a top view of an antenna in accordance with some embodiments of the disclosure.
Figure 5B:
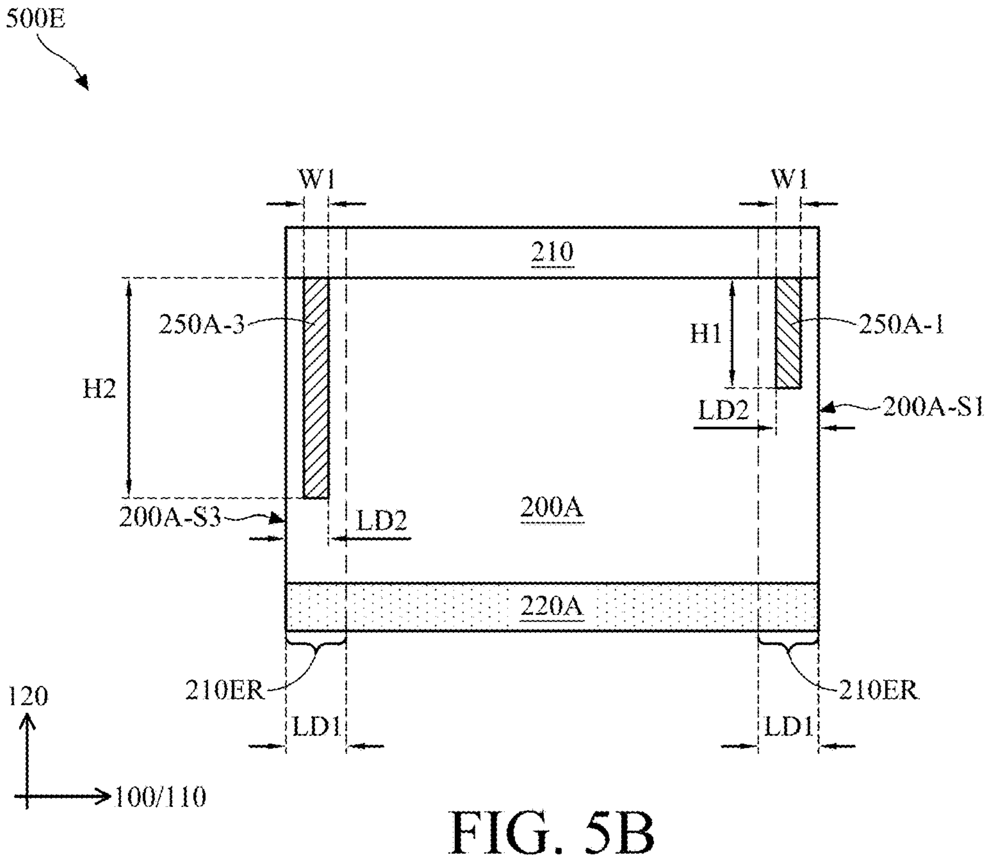
FIG. 5B is a cross-sectional view taken along the line C-C' of the antenna shown in FIG. 5A in accordance with some embodiments of the disclosure.

FIG. 5A is a top view of an antenna 500E in accordance with some embodiments of the disclosure. FIG. 5B is a cross-sectional view taken along the line C-C' of the antenna 500E shown in FIG. 5A in accordance with some embodiments of the disclosure, showing the arrangement of embedded conductive feature of the antenna 500E. Elements of the embodiments hereinafter, that are the same or similar as those previously described with reference to FIGS. 1A, and 1B, are not repeated for brevity. As shown in FIGS. 5A and 5B, the difference between the antenna 500E and the antenna 500A is that the antenna 500E includes three conductive features 250A-1, 250A-2 and 250A-3 embedded in the antenna substrate 200A and close to the three corresponding edges 210E1, 210E2 and 210E3 of the antenna layer 210. Similar to the conductive features 250A-1 and 250A-2 as shown in FIGS. 1A and 1B, the conductive feature 250A-3 may include a single wall structure continuously extends parallel to the corresponding edge 210E3 of the antenna layer 210. The number of the conductive features 250A-1, 250A-2 and 250A-3 (i.e., three) having the single wall structure may be less than the number of the edges 210E (i.e., four) of the antenna layer 210. In some embodiments, the conductive feature 250A-3 having the single wall structure and the corresponding edge 210E3 of the antenna layer 210 may be in a one-to-one relationship. In some embodiments, the conductive features 250A-1, 250A-2 and 250A-3 are formed inside the antenna substrate 200A and are not exposed from the corresponding side surfaces 200A-S1, 200A-S2 and 200A-S3 of the antenna substrate 200A. In some embodiments, the conductive features 250A-1, 250A-2 and 250A-3 are exposed from the corresponding side surfaces 200A-S1, 200A-S2 and 200A-S3 of the antenna substrate 200A. In some embodiments, the conductive features 250A-1, 250A-2 and 250A-3 may have the same or similar structure (e.g., a single wall structure), the shape, length (e.g., the length L1), width (e.g., the width W1) and position relative to the antenna layer 210 and the antenna substrate 200A. In some embodiments, the conductive features 250A-1 and 250A-2 have the same height H1, and the conductive feature 250A-3 has a height H2 different form the height H1. For example, the height H2 is greater than the height H1. That is to say, the conductive feature 250A-3 is closer to the grounding layer 220A than the conductive features 250A-1 and 250A-2. Therefore, the shunt capacitance of the antenna 500E may be further increased.

Figure 6A:
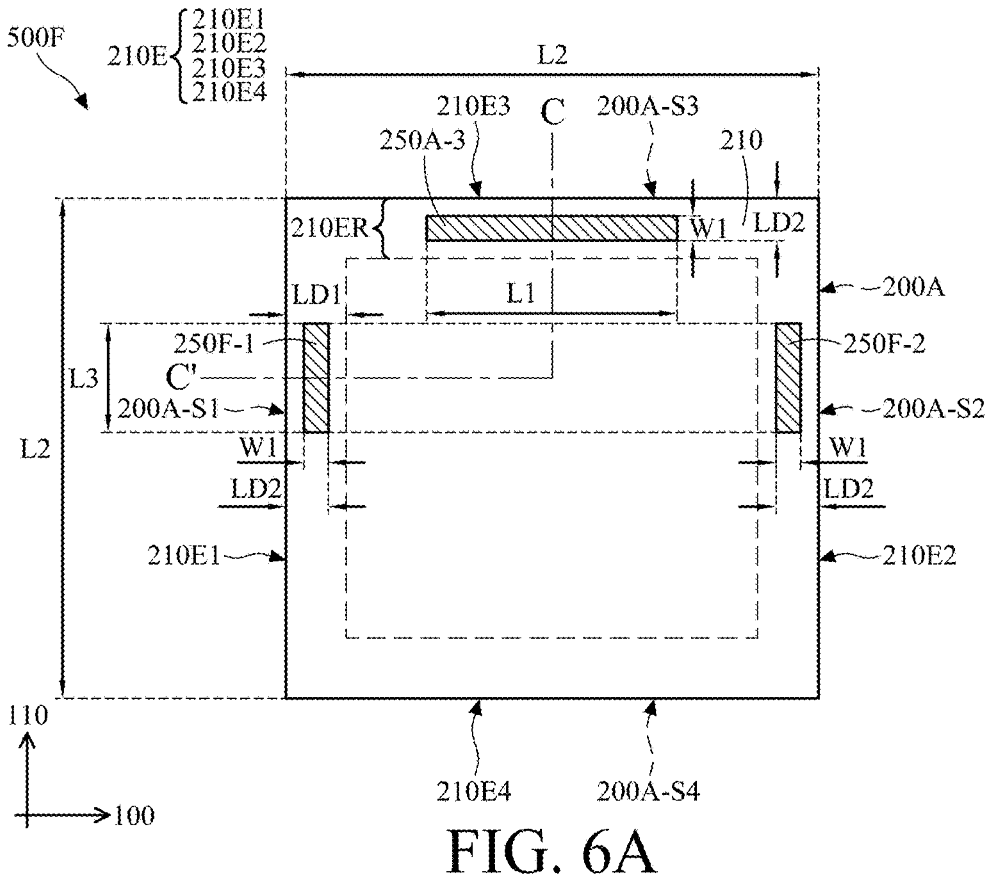
FIG. 6A is a top view of an antenna in accordance with some embodiments of the disclosure.
Figure 6B:
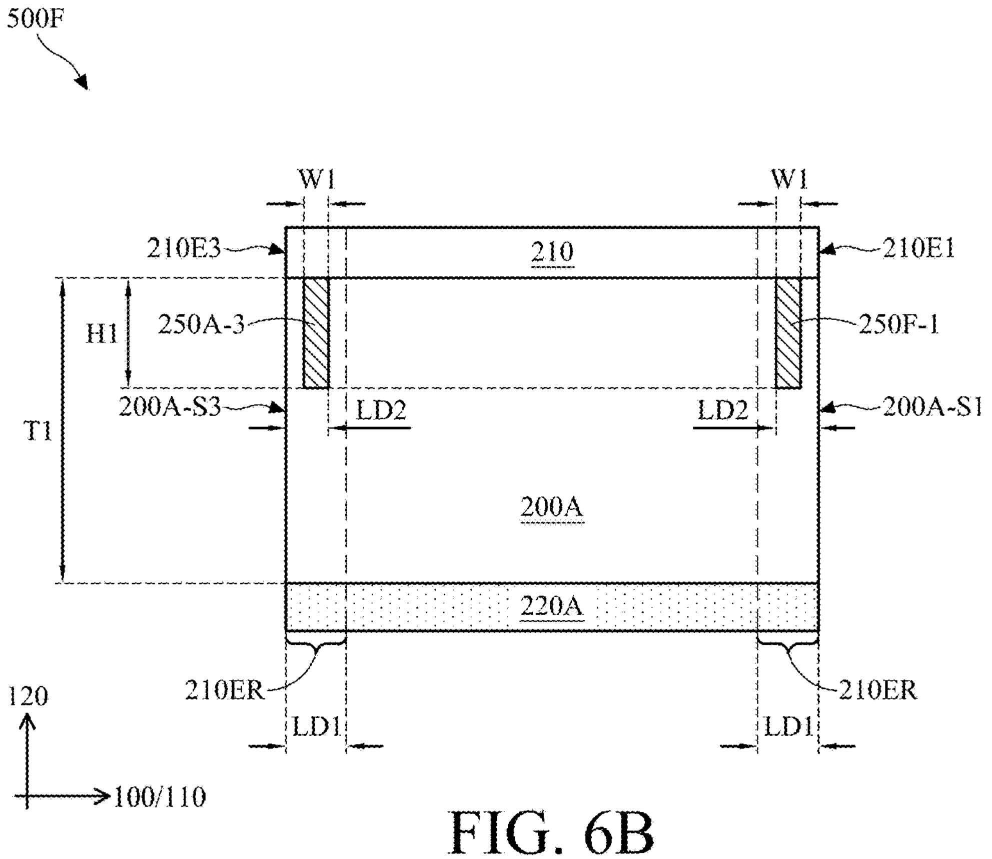
FIG. 6B is a cross-sectional view taken along the line C-C' of the antenna shown in FIG. 6A in accordance with some embodiments of the disclosure.

FIG. 6A is a top view of an antenna 500F in accordance with some embodiments of the disclosure. FIG. 6B is a cross-sectional view taken along the line A-A' of the antenna 500F shown in FIG. 6A in accordance with some embodiments of the disclosure, showing the arrangement of embedded conductive feature of the antenna 500F. Elements of the embodiments hereinafter, that are the same or similar as those previously described with reference to FIGS. 1A, 1B, 4A, and 4B, are not repeated for brevity. As shown in FIGS. 6A and 6B, the difference between the antenna 500F and the antenna 500D (FIGS. 4A and 4B) is that the antenna 500F includes three conductive features 250F-1, 250F-2 and 250A-3 embedded in the antenna substrate 200A and close to the three corresponding edges 210E1, 210E2 and 210E3 of the antenna layer 210. Similar to the conductive features 250A-1 and 250A-2 as shown in FIGS. 1A and 1B, the conductive features 250F-1, 250F-2 may include a single wall structure continuously extends parallel to the corresponding edges 210E1, 210E2 of the antenna layer 210. In some embodiments, the conductive feature 250A-3 has the length L1, and the conductive features 250F-1, 250F-2 both have a length L3 different form the length L1. For example, the length L3 is shorter than the length L1. In some embodiments, the conductive features 250F-1, 250F-2 may have different lengths, widths and/or the heights. The antenna 500F including the conductive features 250F-1, 250F-2 and 250A-3 may increase shunt capacitance and provide increased design flexibility.

Figure 7A:
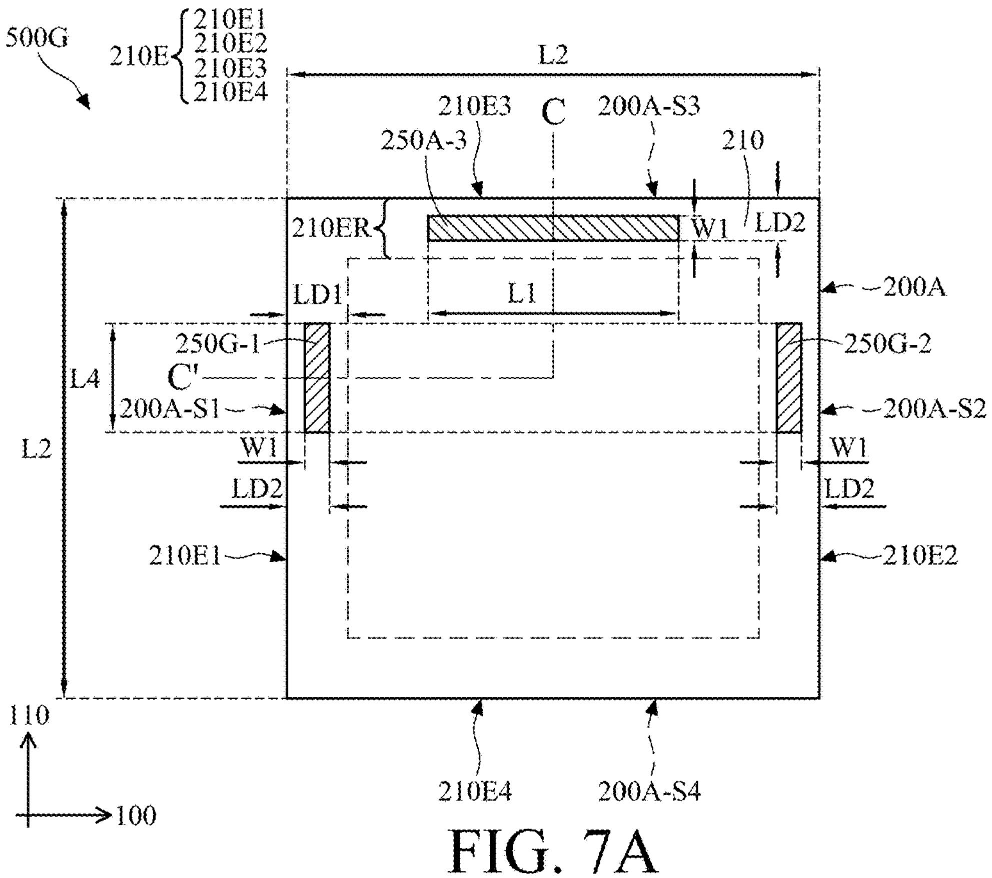
FIG. 7A is a top view of an antenna in accordance with some embodiments of the disclosure.
Figure 7B:
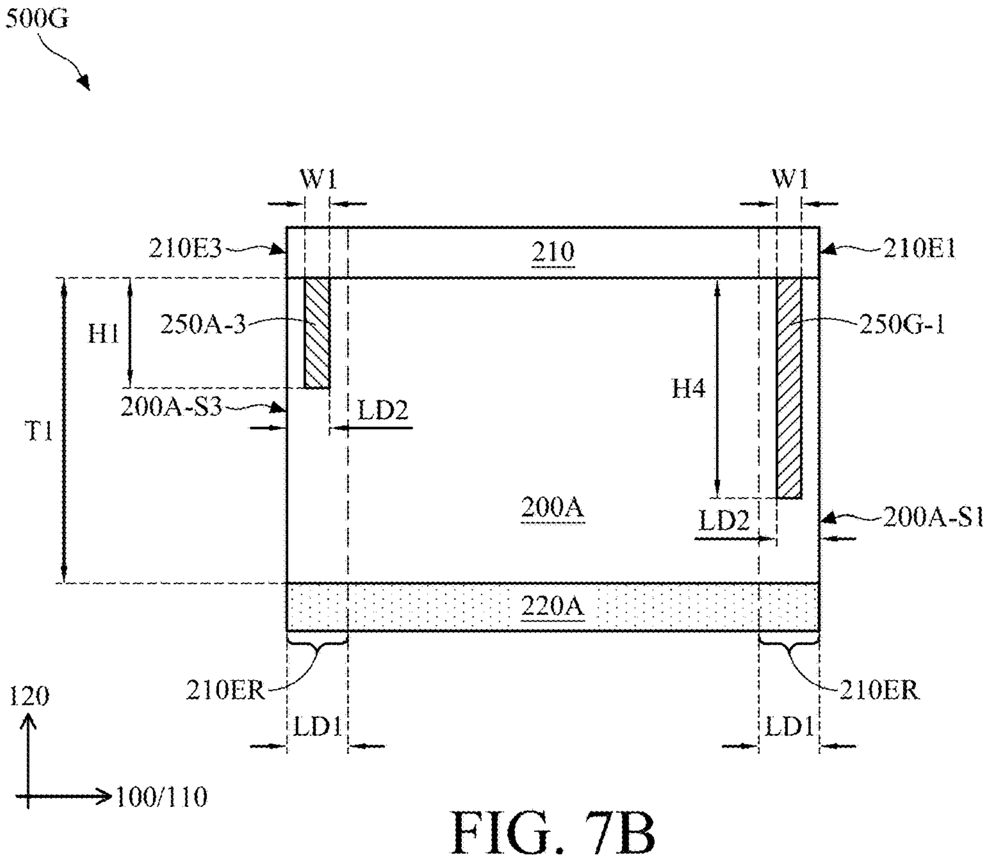
FIG. 7B is a cross-sectional view taken along the line C-C' of the antenna shown in FIG. 7A in accordance with some embodiments of the disclosure.

FIG. 7A is a top view of an antenna 500G in accordance with some embodiments of the disclosure. FIG. 7B is a cross-sectional view taken along the line C-C' of the antenna 500G shown in FIG. 7A in accordance with some embodiments of the disclosure, showing the arrangement of embedded conductive feature of the antenna 500G. Elements of the embodiments hereinafter, that are the same or similar as those previously described with reference to FIGS. 1A, 1B, 4A, 4B, 5A, and 5B, are not repeated for brevity. As shown in FIGS. 7A and 7B, the difference between the antenna 500G and the antenna 500F (FIGS. 5A and 5B) is that the antenna 500G includes three conductive features 250G-1, 250G-2 and 250A-3 embedded in the antenna substrate 200A and close to the three corresponding edges 210E1, 210E2 and 210E3 of the antenna layer 210. Similar to the conductive features 250A-1 and 250A-2 as shown in FIGS. 1A and 1B, the conductive features 250G-1, 250G-2 may include a single wall structure continuously extends parallel to the corresponding edges 210E1, 210E2 of the antenna layer 210. In some embodiments, the conductive features 250G-1, 250G-2 and 250A-3 may have the same or similar structure (e.g., a single wall structure), shape, width (e.g., the width W1) and position relative to the antenna layer 210 and the antenna substrate 200A. In some embodiments, the conductive feature 250A-3 has the length L1, and the conductive features 250G-1, 250G-2 both have a length L4 different form the length L1. For example, the length L4 is shorter than the length L1. In some embodiments, the conductive feature 250A-3 has the height H1, and the conductive features 250G-1, 250G-2 both have a height H4 different form the height H1. For example, the height H4 is greater than the height H1. In some embodiments, the conductive features 250G-1, 250G-2 may have different lengths, widths and/or the heights. The antenna 500G including the conductive features 250G-1, 250G-2 and 250A-3 may increase shunt capacitance and provide increased design flexibility.

Figure 8A:
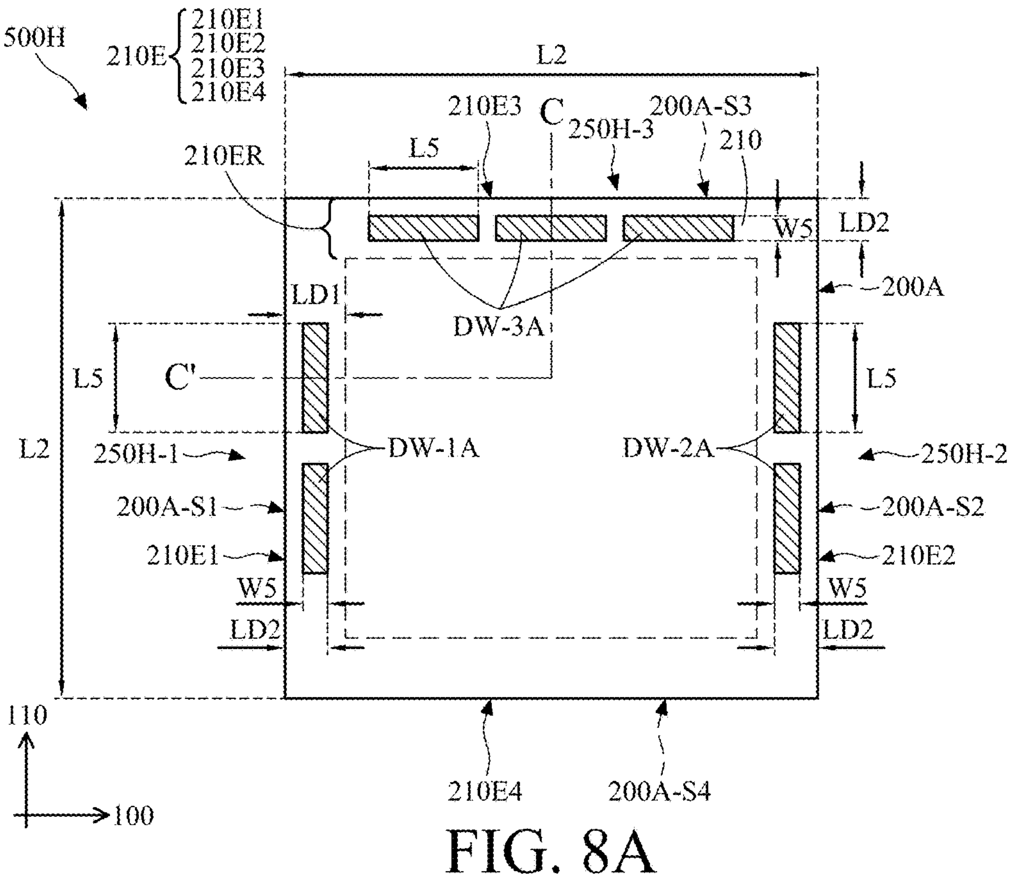
FIG. 8A is a top view of an antenna in accordance with some embodiments of the disclosure.
Figure 8B:
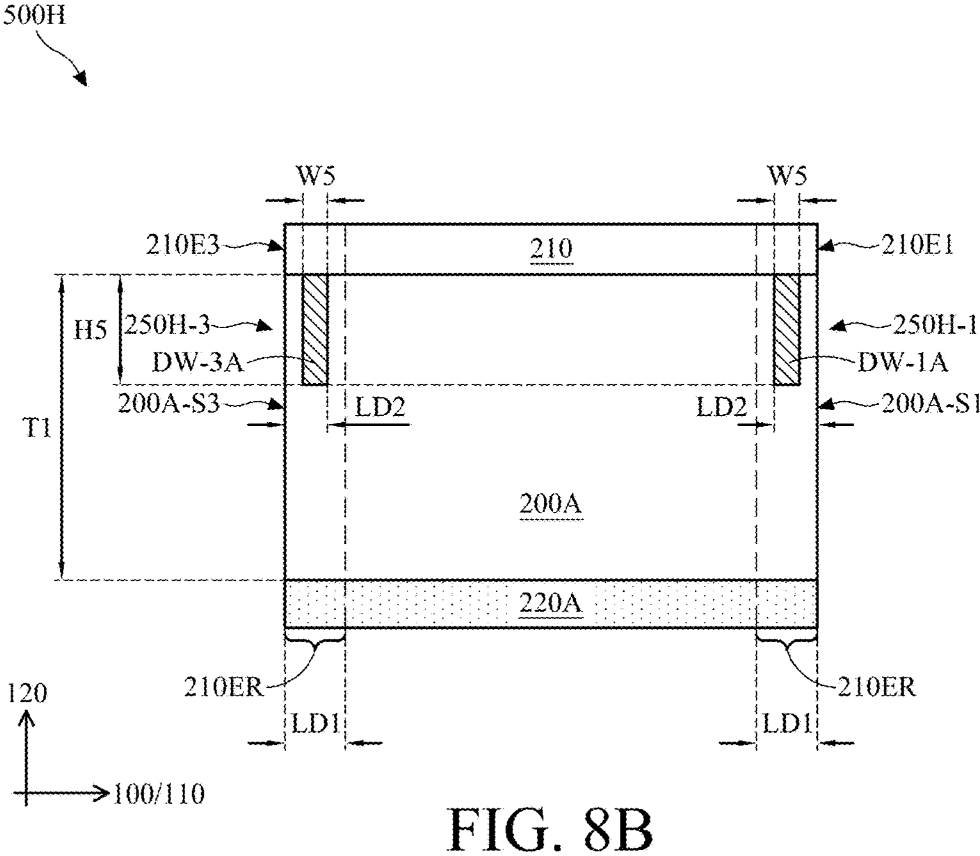
FIG. 8B is a cross-sectional view taken along the line C-C' of the antenna shown in FIG. 8A in accordance with some embodiments of the disclosure.

FIG. 8A is a top view of an antenna 500H in accordance with some embodiments of the disclosure. FIG. 8B is a cross-sectional view taken along the line C-C' of the antenna 500H shown in FIG. 8A in accordance with some embodiments of the disclosure, showing the arrangement of embedded conductive feature of the antenna 500H. Elements of the embodiments hereinafter, that are the same or similar as those previously described with reference to FIGS. 1A, 1B, 4A, and 4B, are not repeated for brevity. As shown in FIGS. 8A and 8B, the difference between the antenna 500H and the antenna 500D (FIGS. 4A and 4B) is that the antenna 500H includes three conductive features 250H-1, 250H-2 and 250H-3 composed of discrete wall structures. The conductive features 250H-1, 250H-2 and 250H-3 are embedded in the antenna substrate 200A and close to the three corresponding edges 210E1, 210E2 and 210E3 of the antenna layer 210. In some embodiments, the conductive features 250H-1, 250H-2 and 250H-3 are formed inside the antenna substrate 200A and are not exposed from the corresponding side surfaces 200A-S1, 200A-S2 and 200A-S3 of the antenna substrate 200A. In some embodiments, the conductive features 250H-1, 250H-2 and 250H-3 are exposed from the corresponding side surfaces 200A-S1, 200A-S2 and 200A-S3 of the antenna substrate 200A.

In some embodiments, the conductive features 250H-1, 250H-2 and 250H-3 include discrete wall structures arranged side-by-side and close to the corresponding edges 210E1, 210E2 and 210E3 of the antenna layer 210. For example, the conductive feature 250H-1 includes discrete wall structures DW-1A arranged side-by-side and close to the corresponding edge 210E1 of the antenna layer 210. The conductive feature 250H-2 includes discrete wall structures DW-2A arranged side-by-side and close to the corresponding edge 210E2 of the antenna layer 210. The conductive feature 250H-3 includes discrete wall structures DW-3A arranged side-by-side and close to the corresponding edge 210E3 of the antenna layer 210.

In some embodiments, the discrete wall structures of each of the conductive features 250H-1, 250H-2 and 250H-3 are separated from each other and arranged in a row (or arranged in an array of 1×m, wherein m is an integer equal to or greater than one) along the corresponding edge 210E of the antenna layer 210. For example, the discrete wall structures DW-1A of the conductive feature 250H-1 are separated from each other and arranged in a row (or arranged in an array of 1×m, wherein m is an integer equal to or greater than one) along the corresponding edge 210E1 of the antenna layer 210. The discrete wall structures DW-2A of the conductive feature 250H-2 are separated from each other and arranged in a row (or arranged in an array of 1×m, wherein m is an integer equal to or greater than one) along the corresponding edge 210E2 of the antenna layer 210. The discrete wall structures DW-3A of the conductive feature 250H-3 are separated from each other and arranged in a row (or arranged in an array of 1×m, wherein m is an integer equal to or greater than one) along the corresponding edge 210E3 of the antenna layer 210.

In some embodiments, the discrete wall structures DW-1A, DW-2A, DW-3A and the corresponding edges 210E1, 210E2, 210E3 of the antenna layer 210 may be in a many-to-one relationship. In some embodiments, the discrete wall structures DW-1A, DW-2A, DW-3A may have the same length L5, width W5 and the height H5. The length L5 may be shorter than the length L1 of the conductive feature 250A-1 (FIGS. 1A and 1B). The width W5 may be the same as or different from the width W1 of the conductive feature 250A-1 (FIGS. 1A and 1B). In addition, the height H5 may be the same as or different from the width H1 of the conductive feature 250A-1 (FIGS. 1A and 1B). In some embodiments, the conductive features 250H-1, 250H-2 and 250H-3 may have the same or similar structure (e.g., the discrete wall structures), geometric dimension (e.g., the shape, the length L5, the width W5 and the height H5 of the discrete wall structures DW-1A, DW-2A, DW-3A) and position relative to the antenna layer 210 and the antenna substrate 200A. In some embodiments, the discrete wall structures DW-1A, DW-2A, DW-3A may have different lengths, widths and/or the heights. The antenna 500H including the conductive features 250H-1, 250H-2 and 250H-3 may increase shunt capacitance and provide increased design flexibility.

Figure 9A:
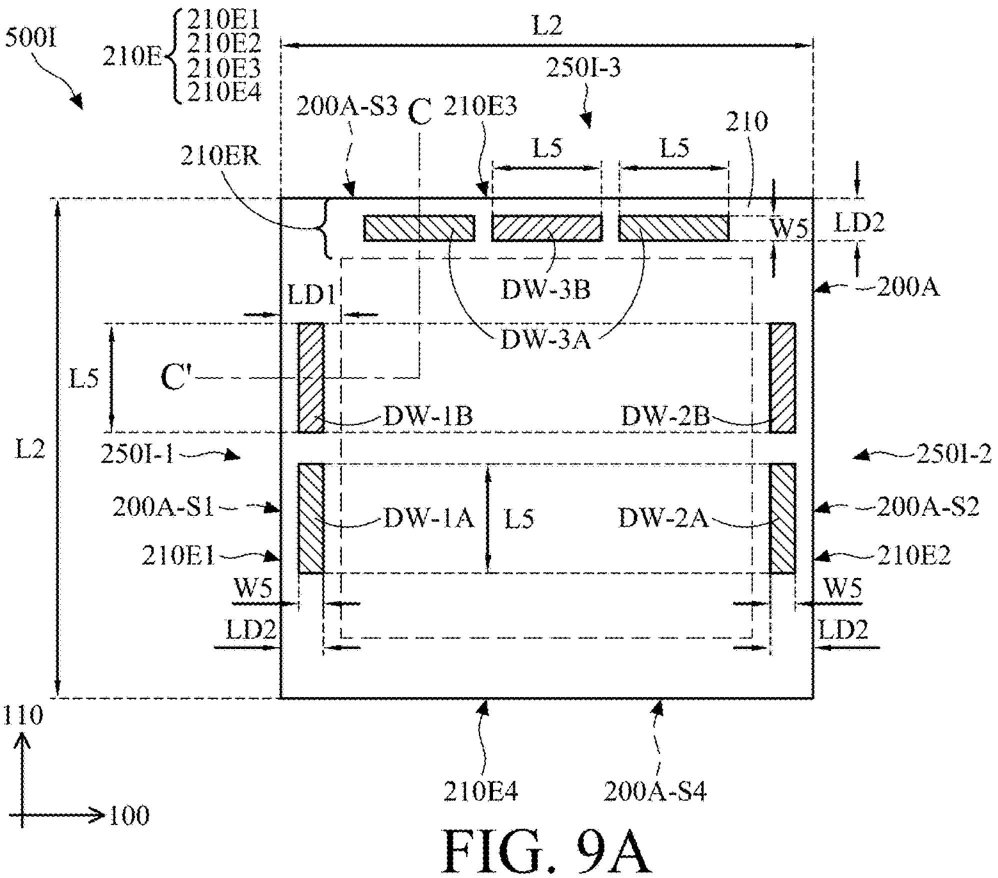
FIG. 9A is a top view of an antenna in accordance with some embodiments of the disclosure.
Figure 9B:
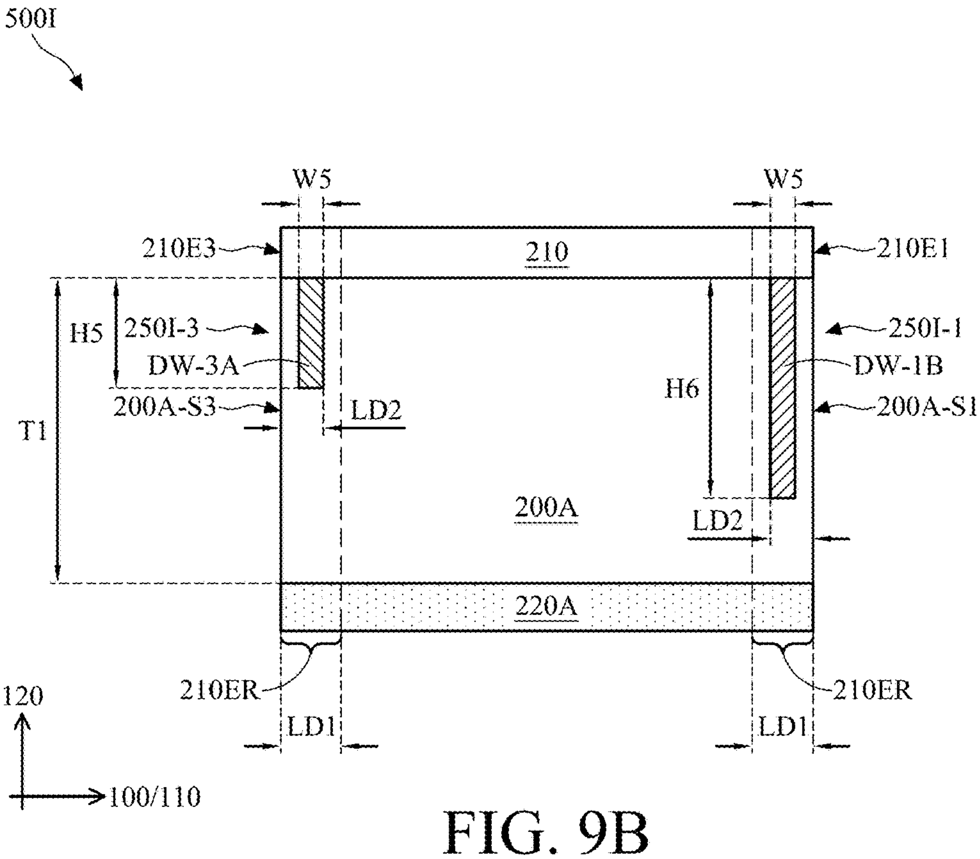
FIG. 9B is a cross-sectional view taken along the line C-C' of the antenna shown in FIG. 9A in accordance with some embodiments of the disclosure.

FIG. 9A is a top view of an antenna 500I in accordance with some embodiments of the disclosure. FIG. 9B is a cross-sectional view taken along the line C-C' of the antenna 500I shown in FIG. 9A in accordance with some embodiments of the disclosure, showing the arrangement of embedded conductive feature of the antenna 500I. Elements of the embodiments hereinafter, that are the same or similar as those previously described with reference to FIGS. 1A, 1B, 4A, 4B, 8A and 8B, are not repeated for brevity. As shown in FIGS. 9A and 9B, the difference between the antenna 500I and the antenna 500H (FIGS. 8A and 8B) is that the antenna 500I includes three conductive features 250I-1, 250I-2 and 250I-3 composed of discrete wall structures having different heights along the direction 120. As shown in FIGS. 9A and 9B, the conductive features 250I-1, 250I-2 and 250I-3 of the antenna 500I embedded in the antenna substrate 200A and close to the three corresponding edges 210E1, 210E2 and 210E3 of the antenna layer 210.

In some embodiments, the conductive features 250I-1, 250I-2 and 250I-3 include discrete wall structures arranged side-by-side and close to the corresponding edges 210E1, 210E2 and 210E3 of the antenna layer 210. For example, the conductive feature 250I-1 includes discrete wall structures DW-1A and DW-1B arranged side-by-side and close to the corresponding edge 210E1 of the antenna layer 210. The conductive feature 250I-2 includes discrete wall structures DW-2A and DW-2B arranged side-by-side and close to the corresponding edge 210E2 of the antenna layer 210. The conductive feature 250I-3 includes discrete wall structures DW-3A and DW-3B arranged side-by-side and close to the corresponding edge 210E3 of the antenna layer 210.

In some embodiments, the discrete wall structures of each of the conductive features 250I-1, 250I-2 and 250I-3 are separated from each other and arranged in a row (or arranged in an array of 1×m, wherein m is an integer equal to or greater than one) along the corresponding edge 210E of the antenna layer 210.

In some embodiments, the discrete wall structures DW-1A and DW-1B, DW-2A and DW-2B, DW-3A and DW-3B and the corresponding edges 210E1, 210E2, 210E3 of the antenna layer 210 may be in a many-to-one relationship. In some embodiments, the discrete wall structures DW-1A, DW-1B, DW-2A, DW-2B, DW-3A and DW-3B may have the same length L5, width W5. In some embodiments, the discrete wall structures DW-1B, DW-1B and DW-3B may have a height H6 different from the height H5 of the discrete wall structures DW-1A, DW-1A and DW-3A. For example, the height H6 may be greater than the height H5. In some embodiments, the conductive features 250I-1, 250I-2 and 250I-3 may have the same or similar structure (e.g., the discrete wall structures), geometric dimension (e.g., the shape, the length L5, the width W5 and the heights H5, H6 of the discrete wall structures DW-1A, DW-1B, DW-2A, DW-2B, DW-3A and DW-3B) and position relative to the antenna layer 210 and the antenna substrate 200A. In some embodiments, the discrete wall structures DW-1A, DW-1B, DW-2A, DW-2B, DW-3A and DW-3B may have different lengths and/or widths. The antenna 500I including the conductive features 250I-1, 250I-2 and 250I-3 may increase shunt capacitance and provide increased design flexibility.

In some embodiments, the conductive features may have various shapes of the same or different heights in the cross-sectional view to increase shunt capacitance and provide increased design flexibility.

Figure 10A:
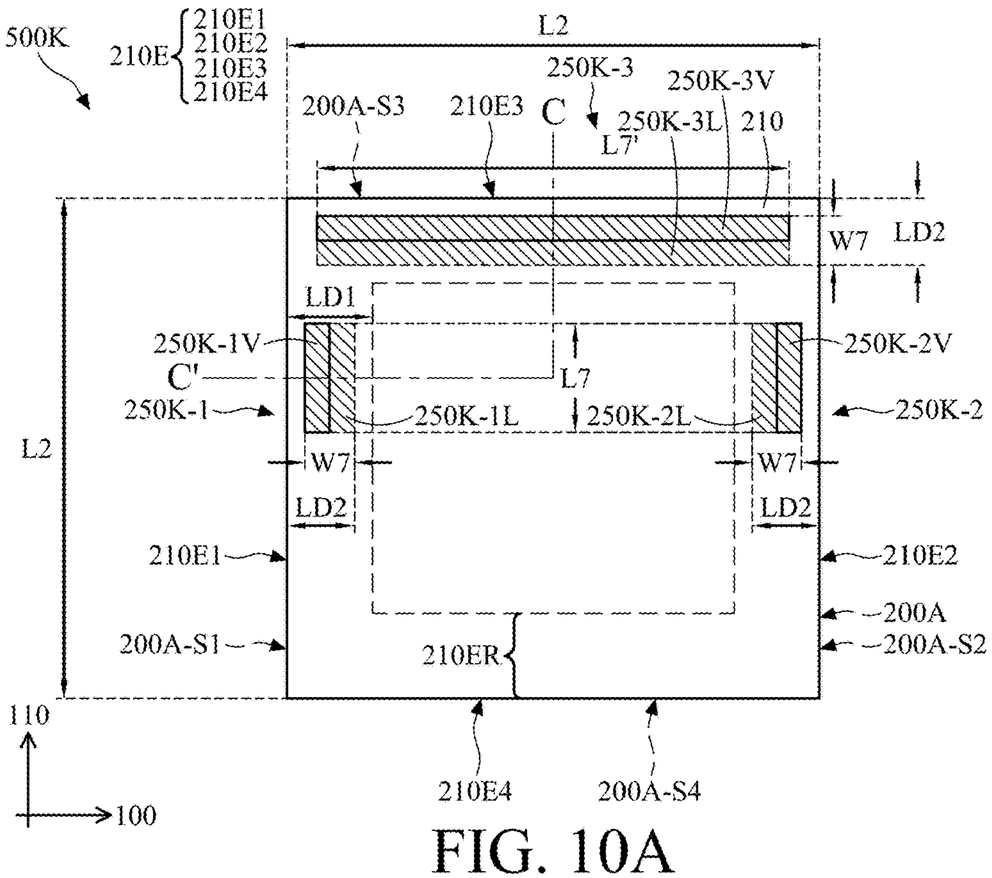
FIG. 10A is a top view of an antenna in accordance with some embodiments of the disclosure.
Figure 10B:
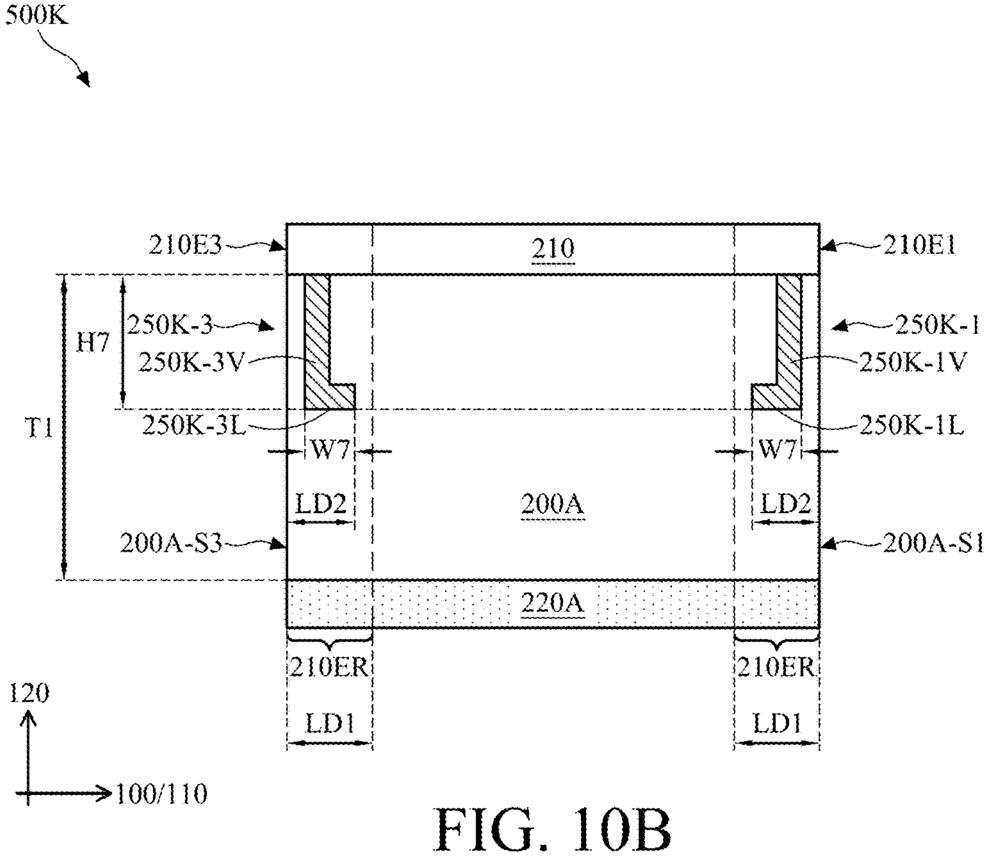
FIG. 10B is a cross-sectional view taken along the line C-C' of the antenna shown in FIG. 10A in accordance with some embodiments of the disclosure.

FIG. 10A is a top view of an antenna 500K in accordance with some embodiments of the disclosure. FIG. 10B is a cross-sectional view taken along the line C-C' of the antenna 500K shown in FIG. 10A in accordance with some embodiments of the disclosure, showing the arrangement of embedded conductive feature of the antenna 500K. Elements of the embodiments hereinafter, that are the same or similar as those previously described with reference to FIGS. 1A, 1B, 4A, 4B, 6A, and 6B, are not repeated for brevity. As shown in FIGS. 10A and 10B, the difference between the antenna 500K and the antenna 500F (FIGS. 6A and 6B) is that the antenna 500K includes three L-shape (or reversed L-shape) conductive features 250K-1, 250K-2 and 250K-3. The conductive features 250K-1, 250K-2 and 250K-3 are embedded in the antenna substrate 200A and close to the three corresponding edges 210E1, 210E2 and 210E3 of the antenna layer 210.

In a cross-sectional view as shown in FIG. 10A, the conductive features 250K-1, 250K-2 and 250K-3 are L-shape (or reversed L-shape). The conductive features 250K-1, 250K-2 and 250K-3 have vertical portions (or first portions) 250K-1V, 250K-2V and 250K-3V and lateral portions 250K-1L, 250K-2L and 250K-3L connected to the vertical portions (or the first portions) 250K-1V, 250K-2V and 250K-3V. The vertical portions (or the first portions) 250K-1V, 250K-2V and 250K-3V may be close to the top surface 200A-T of the antenna substrate 200 and extend along to the direction 120. The lateral portions 250K-1L, 250K-2L and 250K-3L may be close to the bottom surface 200A-B of the antenna substrate 200 and extend toward the central portion of the antenna substrate 200A. In addition, the lateral portions 250K-1L, 250K-2L and 250K-3L may extend substantially parallel to the antenna layer 210.

In some embodiments, the conductive features 250K-1, 250K-2 both have a length L7, and the conductive feature 250K-3 has the length L7' different form the length L7. For example, the length L7 is shorter than the length L7'. In some embodiments, the conductive features 250K-1, 250K-2 and 250K-3 have the same height H7 less than the thickness T1 of the antenna substrate 200A. The lateral portions 250K-1L, 250K-2L and 250K-3L have the same width W7 (also serve as the maximum width of the conductive features 250K-1, 250K-2 and 250K-3). In some embodiments, the conductive features 250K-1, 250K-2 and 250K-3 may have different lengths, widths, and/or heights. In some embodiments, the width W7 is less than or equal to 0.1 λg, wherein λg is the guided wavelength of 50Ω microstrip at the center frequency. The antenna 500K including the conductive features 250K-1, 250K-2 and 250K-3 may increase shunt capacitance and provide increased design flexibility.

Figure 11A:
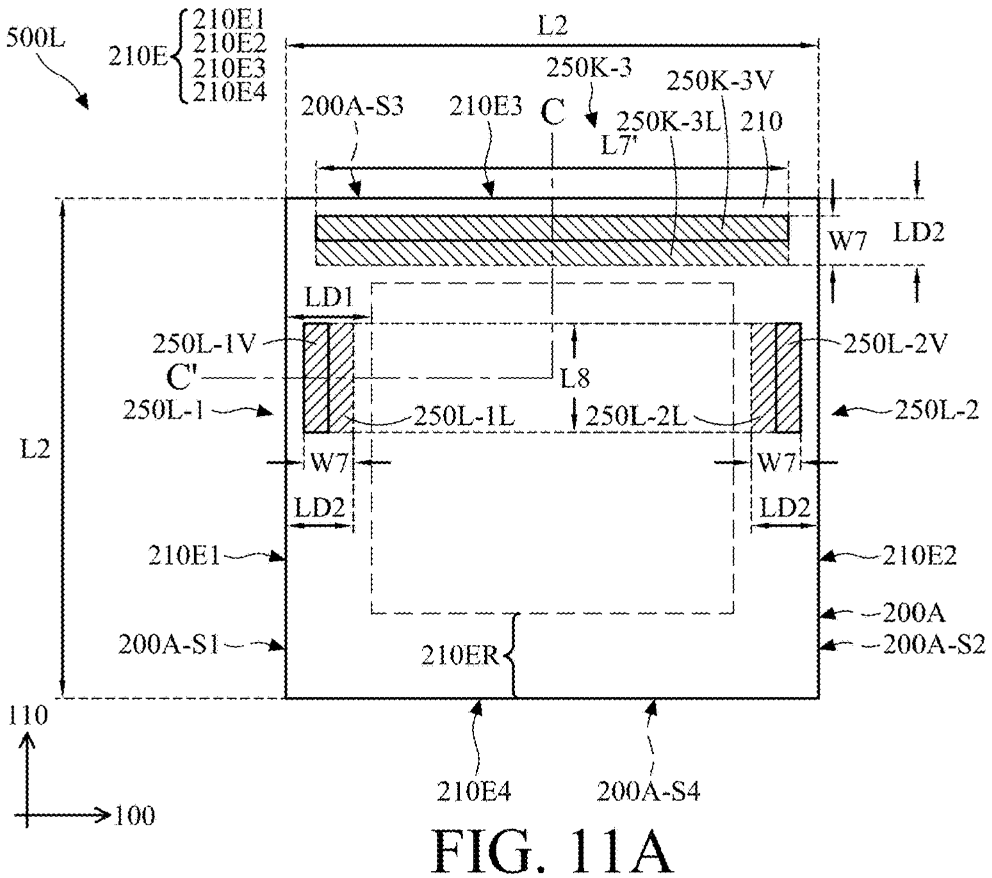
FIG. 11A is a top view of an antenna in accordance with some embodiments of the disclosure.
Figure 11B:
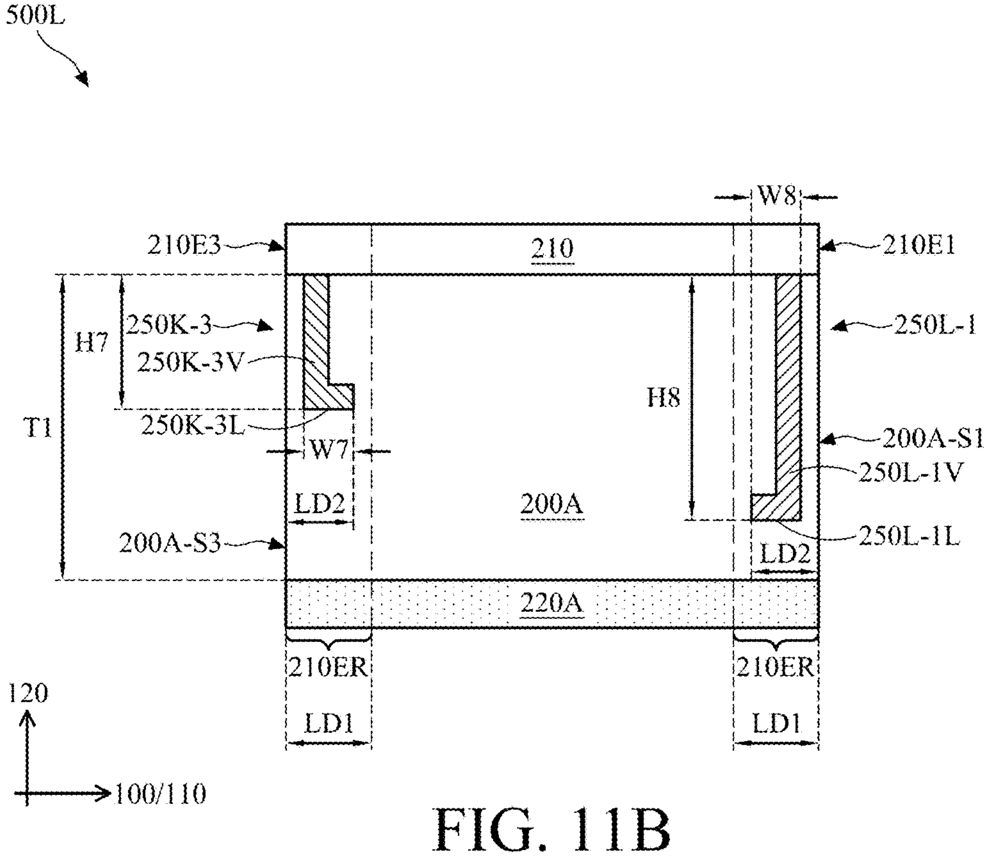
FIG. 11B is a cross-sectional view taken along the line C-C' of the antenna shown in FIG. 11A in accordance with some embodiments of the disclosure.

FIG. 11A is a top view of an antenna 500L in accordance with some embodiments of the disclosure. FIG. 11B is a cross-sectional view taken along the line C-C' of the antenna 500L shown in FIG. 11A in accordance with some embodiments of the disclosure, showing the arrangement of embedded conductive feature of the antenna 500L. Elements of the embodiments hereinafter, that are the same or similar as those previously described with reference to FIGS. 1A, 1B, 4A, 4B, 6A, 6B, 10A and 10B, are not repeated for brevity. As shown in FIGS. 11A and 11B, the difference between the antenna 500L and the antenna 500K (FIGS. 10A and 10B) is that the antenna 500L includes three conductive features 250L-1, 250L-2 and 250K-3 having different heights.

In a cross-sectional view as shown in FIG. 11A, the first conductive feature is L-shape (or reversed L-shape). Similar to the conductive feature 250K-3, the conductive features 250L-1, 250L-2 have vertical portions 250L-1V, 250L-2V and lateral portions 250L-1L, 250L-2L connected to the vertical portions 250L-1V, 250L-2V. The vertical portions 250L-1V, 250L-2V may be close to the top surface 200A-T of the antenna substrate 200 and extend along to the direction 120. The lateral portions 250L-1V, 250L-2V may be close to the bottom surface 200A-B of the antenna substrate 200 and extend toward the central portion of the antenna substrate 200A. In addition, the lateral portions 250L-1V, 250L-2V may extend substantially parallel to the antenna layer 210.

In some embodiments, the conductive features 250L-1, 250L-2 both have a length L8, and the conductive feature 250K-3 has the length L7' different form the length L8. For example, the length L8 is shorter than the length L7'. In some embodiments, the lateral portions 250L-1V, 250L-2V have the same width W8 (also serve as the maximum width W8 of the conductive features 250L-1, 250L-2). In some embodiments, the conductive features 250L-1, 250L-2 may have different lengths, widths, and/or heights. In some embodiments, the width W8 is less than or equal to 0.1 λg, wherein λg is the guided wavelength of 50Ω microstrip at the center frequency. In some embodiments, the maximum width W8 of the conductive features 250L-1, 250L-2 may be the same or different from the maximum width W7 of the conductive feature 250K-3.

In some embodiments, the conductive features 250L-1, 250L-2 have the same height H8 less than the thickness T1 of the antenna substrate 200A. In addition, the height H8 of the conductive features 250L-1, 250L-2 may be different form the height H7 of the conductive feature 250K-3. For example, the height H8 is greater than the height H7. That is to say, the conductive features 250L-1, 250L-2 are closer to the grounding layer 220A than the conductive feature 250K-3. Therefore, the shunt capacitance of the antenna 500L may be further increased. The antenna 500K including the conductive features 250L-1, 250L-2 and 250K-3 may also provide increased design flexibility.

It is appreciated that although some features are shown in some embodiments but not in other embodiments, these features may (or may not) exist in other embodiments whenever possible. For example, although the illustrated example embodiments of FIGS. 10A, 10B, 11A and 11B shows the specific geometric shapes of the conductive features 250K-1, 250K-2, 250K-3, 250L-1 and 250L-2 of the antennas 500K and 500L, any other combinations of the geometric shapes of the conductive feature may also be used whenever applicable. In addition, the geometric shapes of the conductive feature 250K-1, 250K-2, 250K-3, 250L-1 and 250L-2 of the antennas 500K and 500L may be implemented in the conductive features of the antennas 500A to 500I, whenever applicable.

In some embodiments, the conductive feature includes an integrated wall structure or a composite wall structure formed by printed circuit board (PCB) fabrication process. Therefore, the antenna and the conductive feature can be fabricated in the same fabrication process. Therefore, the manufacturing cost can be reduced.

Figure 12:
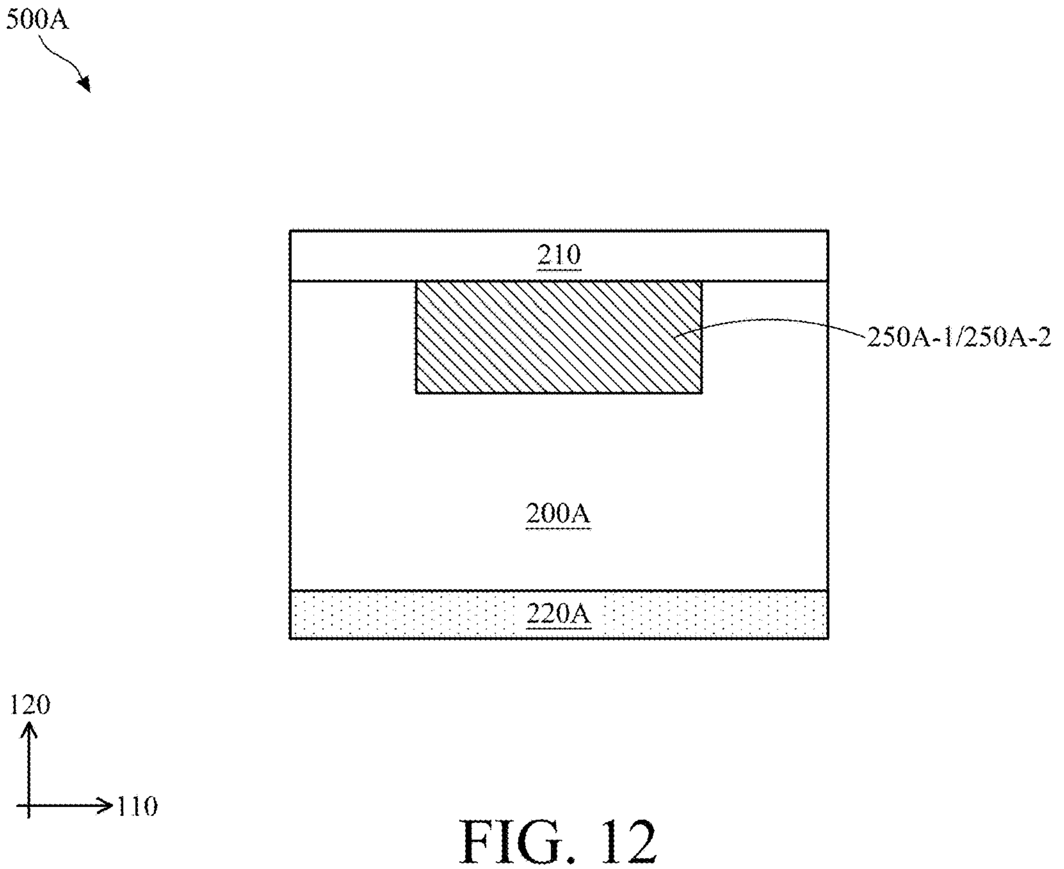
FIG. 12 is a side view of the antenna in accordance with some embodiments of the disclosure.

FIG. 12 is a side view of the antenna 500A of FIGS. 1A and 1B in accordance with some embodiments of the disclosure, showing one type of the detail structure of the embedded conductive feature 250A-1 (or the conductive feature 250A-2) of the antenna 500A. Elements of the embodiments hereinafter, that are the same or similar as those previously described with reference to FIGS. 1A and 1B, are not repeated for brevity. As shown in FIG. 12, the conductive feature 250A-1 (or the conductive feature 250A-2) may be an integrated wall structure, such as a metal slug (a single piece of metal). In some embodiments, the integrated wall structure is formed by metal slug technique of low temperature co-fired ceramic (LTCC) printed circuit board (PCB) fabrication process or another applicable process.

Figure 13:
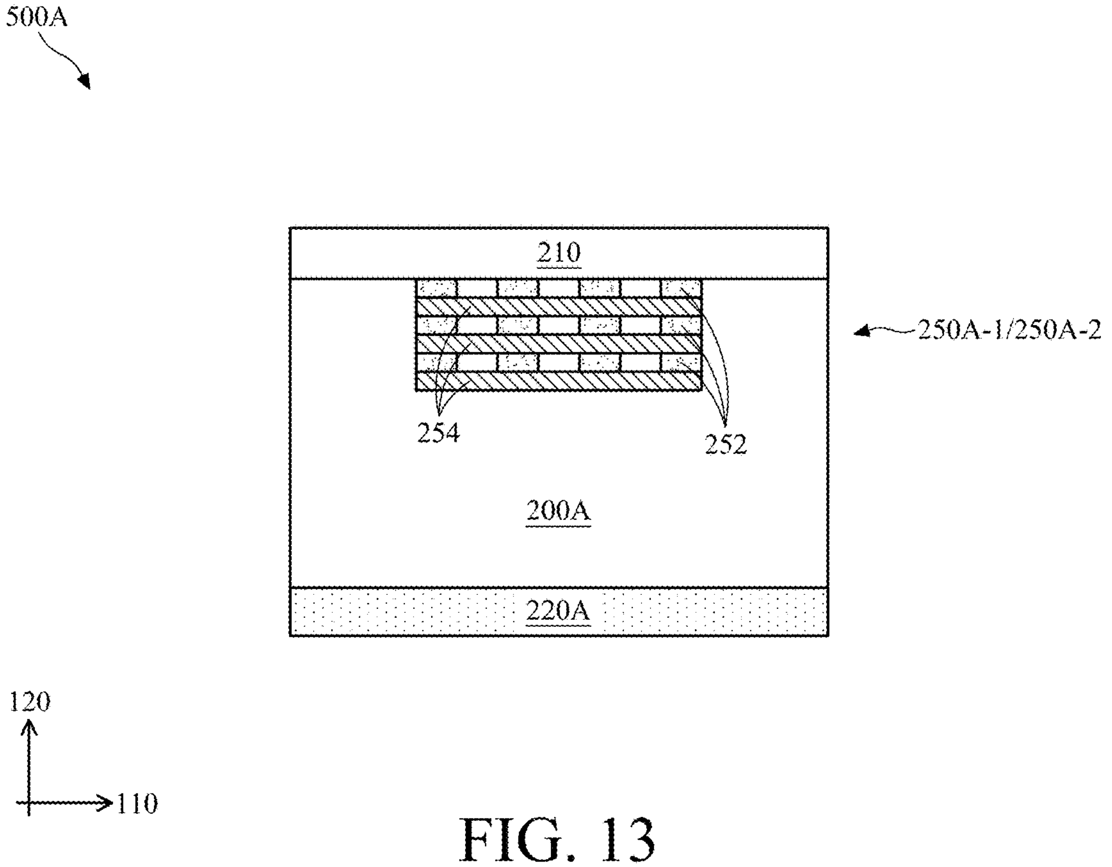
FIG. 13 is a side view of the antenna in accordance with some embodiments of the disclosure.

FIG. 13 is another side view of the antenna 500A of FIGS. 1A and 1B in accordance with some embodiments of the disclosure, showing another type of the detail structure of the embedded conductive feature 250A-1 (or the conductive feature 250A-2) of the antenna 500A. Elements of the embodiments hereinafter, that are the same or similar as those previously described with reference to FIGS. 1A, and 1B, are not repeated for brevity. As shown in FIG. 13, the conductive feature 250A-1 (or the conductive feature 250A-2) may be a composite wall structure including vias 252 and one or more conductive lines 254. The vias 212 disposed on the grounding layer 210 and passing through one or more dielectric layers. In addition, the vias 252 may be arranged as one row passing through the same dielectric layer and corresponding to the edge 210E1 (or the edge 210E2) of the antenna layer 210. The vias 252 may be arranged as multi rows passing through the different dielectric layers and corresponding to the edge 210E1 (or the edge 210E2) of the antenna layer 210. The conductive line 254 is formed between the dielectric layers and extends along the corresponding edge 210E1 (or the edge 210E2) of the antenna layer 210. In addition, the conductive line 254 covers and is electrically connected to the adjacent row(s) of the vias 252. In some embodiments, the composite wall structure is formed by buried hole technique of printed circuit board (PCB) fabrication process or another applicable process.

As shown in FIGS. 12 and 13, the antenna 500A and the conductive feature 250A-1 (or the conductive feature 250A-2) may be fabricated during the printed circuit board (PCB) fabrication process. The conductive feature 250A-1 (or the conductive feature 250A-2) may be formed without additional plating process performed after the fabrication of the antenna 500A. Therefore, the manufacturing cost can be reduced.

It is appreciated that although some features are shown in some embodiments but not in other embodiments, these features may (or may not) exist in other embodiments whenever possible. For example, although each of the illustrated example embodiments of FIGS. 12 and 13 shows the specific structure of the conductive feature 250A-1 (or the conductive feature 250A-2) of the antenna 500A, any other combinations of the structure of the conductive feature may also be used whenever applicable. In addition, the structures of the conductive feature 250A-1 (or the conductive feature 250A-2) of the antenna 500A shown in FIGS. 12 and 13 may be implemented in the conductive features of the antennas 500B to 500I, 500K and 500L whenever applicable.

In some embodiments, the conductive feature may be disposed separated from the antenna layer. The conductive feature and the antenna layer may be electrically connected to each other by electrically coupling to increase shunt capacitance and provide increased design flexibility.

Figure 14A:
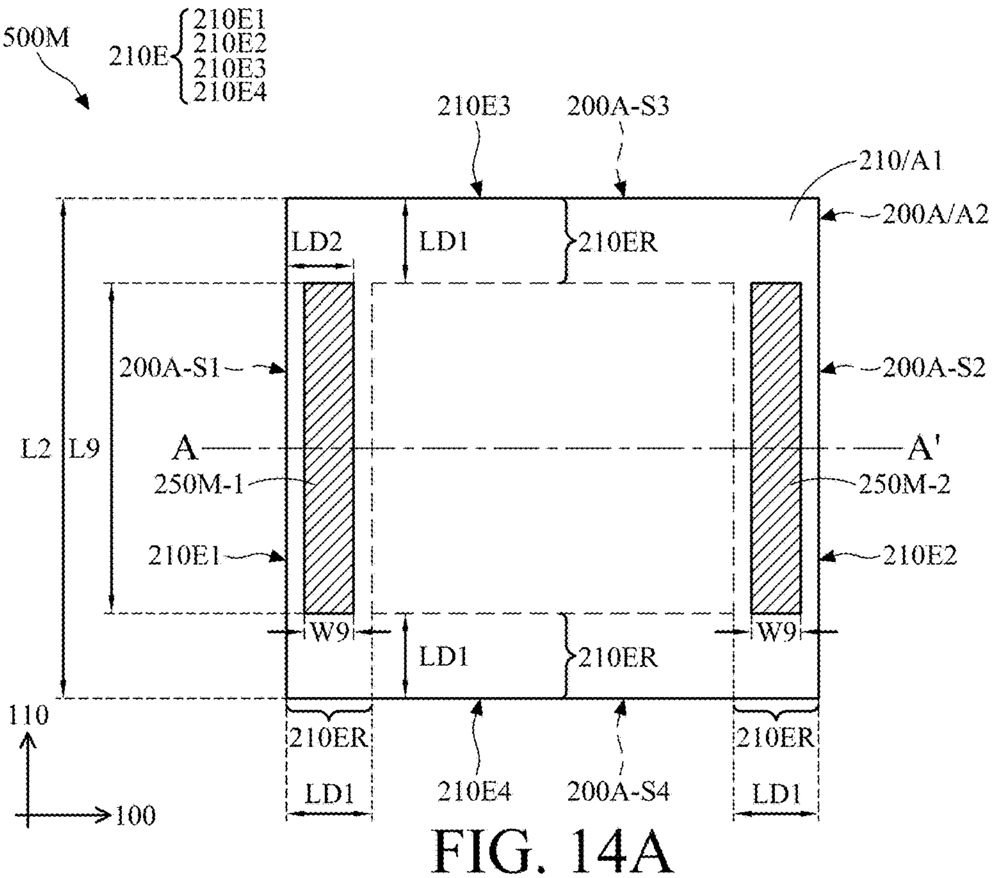
FIG. 14A is a top view of an antenna in accordance with some embodiments of the disclosure.
Figure 14B:
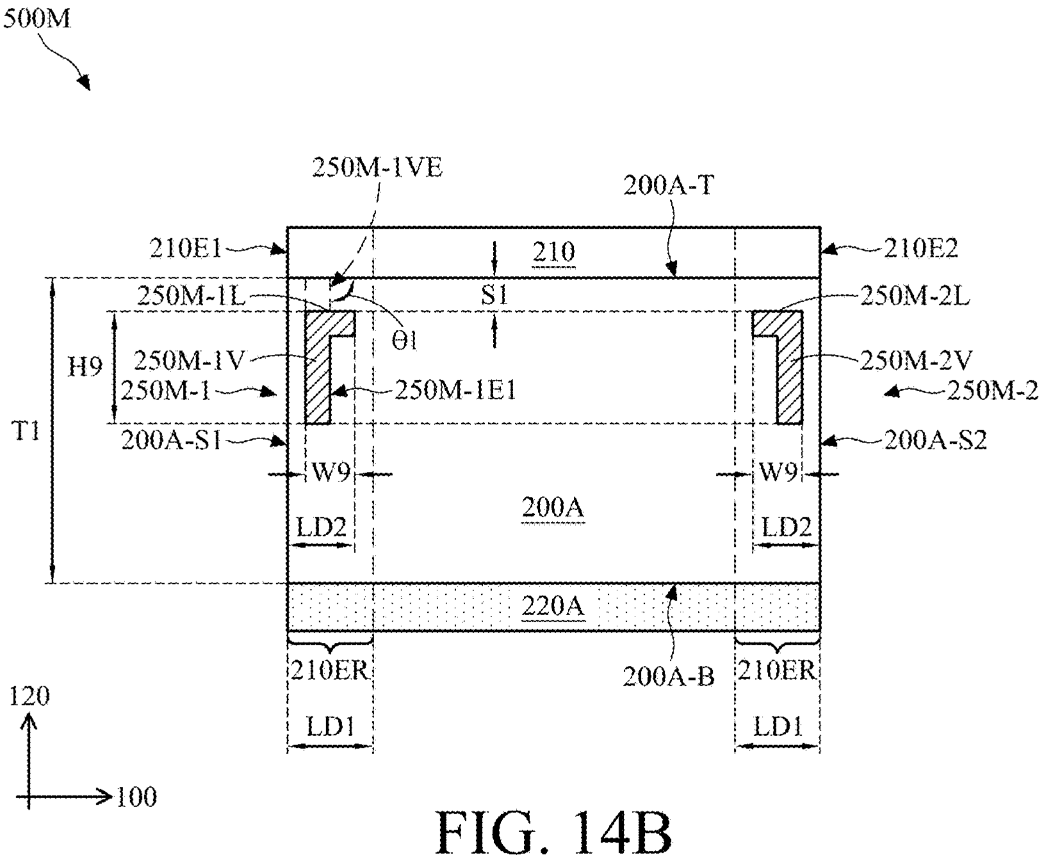
FIG. 14B is a cross-sectional view taken along the line A-A' of the antenna shown in FIG. 14A in accordance with some embodiments of the disclosure.

FIG. 14A is a top view of an antenna 500M in accordance with some embodiments of the disclosure. FIG. 14B is a cross-sectional view taken long the line A-A' of the antenna 500M shown in FIG. 14A in accordance with some embodiments of the disclosure, showing the arrangement of embedded conductive feature of the antenna 500M. Elements of the embodiments hereinafter, that are the same or similar as those previously described with reference to FIGS. 1A, and 1B, are not repeated for brevity. As shown in FIGS. 14A and 14B, the difference between the antenna 500L and the antenna 500A (FIGS. 1A and 1B) is that the antenna 500M includes two conductive features 250M-1 and 250M-2 separated from and electrically coupled to the antenna layer 210. In addition, the conductive features 250M-1 and 250M-2 may be electrically floating. The conductive features 250M-1 and 250M-2 are embedded in the antenna substrate 200A and close to the three corresponding edges 210E1 and 210E2 of the antenna layer 210. In some embodiments, the conductive features 250M-1 and 250M-2 are formed inside the antenna substrate 200A and are not exposed from the corresponding side surfaces 200A-S1 and 200A-S2 of the antenna substrate 200A. In some embodiments, the conductive features 250M-1 and 250M-2 are exposed from the corresponding side surfaces 200A-S1 and 200A-S2 of the antenna substrate 200A.

In a cross-sectional view as shown in FIG. 14B, the conductive features 250M-1 and 250M-2 are inverted L-shape (or reverse inverted L-shape). The conductive features 250M-1 and 250M-2 have vertical portions (or the first portions) 250M-1V and 250M-2V and lateral portions 250M-1L and 250M-2L connected to the vertical portions (or the first portions) 250M-1V and 250M-2V. Compared with the lateral portions 250M-1L and 250M-2L, the vertical portions (or the first portions) 250M-1V and 250M-2V may be closer to the bottom surface 200A-B of the antenna substrate 200 and extend toward the grounding layer 220A along to the direction 120. Compared with the vertical portions 250M-1V and 250M-2V, the lateral portions 250M-1L and 250M-2L may be closer to the top surface 200A-T of the antenna substrate 200 and extend toward the central portion of the antenna substrate 200A. In addition, the lateral portions 250M-1L and 250M-2L may extend substantially parallel to the antenna layer 210.

In some embodiments, the conductive features 250M-1 and 250M-2 have the same length L9 less than the length L2. In some embodiments, the conductive features 250M-1 and 250M-2 have the same height H9 less than the thickness T1 of the antenna substrate 200A. The lateral portions 250M-1L and 250M-2L have the same width W9 (also serve as the maximum width of the conductive features 250M-1 and 250M-2). In some embodiments, the conductive features 250M-1 and 250M-2 may have different lengths, widths, and/or heights. In some embodiments, the width W9 is less than or equal to 0.1 λg, wherein λg is the guided wavelength of 50Ω microstrip at the center frequency.

As shown in FIG. 14B, the conductive features 250M-1 and 250M-2 separated from the antenna layer 210 by a distance S1 substantially along the direction 120. In some embodiments, the distance S1 less than the height H9. The antenna 500M including the conductive features 250M-1 and 250M-2 may increase shunt capacitance and provide increased design flexibility.

In some embodiments, an angle θ1 between extension lines of edges of the vertical portion (or the first portion)

250M-1V of the conductive feature 250M-1 (or extension lines of edges of the vertical portion 250M-2V of the conductive feature 250M-2) and the top surface 200A-T of the antenna substrate 200A is greater than 0 degrees and less than 180 degrees. For example, in some embodiments as shown in FIG. 14B, an angle θ1 between an extension line 250M-1VE of an edge 250M-1E1 of the vertical portion (or the first portion) 250M-1V and the top surface 200A-T of the antenna substrate 200A may be a right angle (i.e., the angle θ1 is equal to 90 degrees), an obtuse angle (i.e., the angle θ1 is greater than 90 degrees and less than 180 degrees), or an acute angle (i.e., the angle θ1 is greater than 0 degrees and less than 90 degrees).

It is appreciated that although some features are shown in some embodiments but not in other embodiments, these features may (or may not) exist in other embodiments whenever possible. For example, although the illustrated example embodiments of FIGS. 14A and 14B shows the specific geometric shapes of the conductive features 250M-1 and 250M-2 of the antennas 500M, any other combinations of the geometric shapes of the conductive feature may also be used whenever applicable. In addition, the geometric shapes of the conductive features 250M-1 and 250M-2 of the antennas 500M may be implemented in the conductive features of the antennas 500A to 500I, whenever applicable.

In some embodiments, the grounding layer of the antenna may have a protruding portion that extends toward the conductive feature to further increase the shunt capacitance and provide increased design flexibility.

Figure 15:
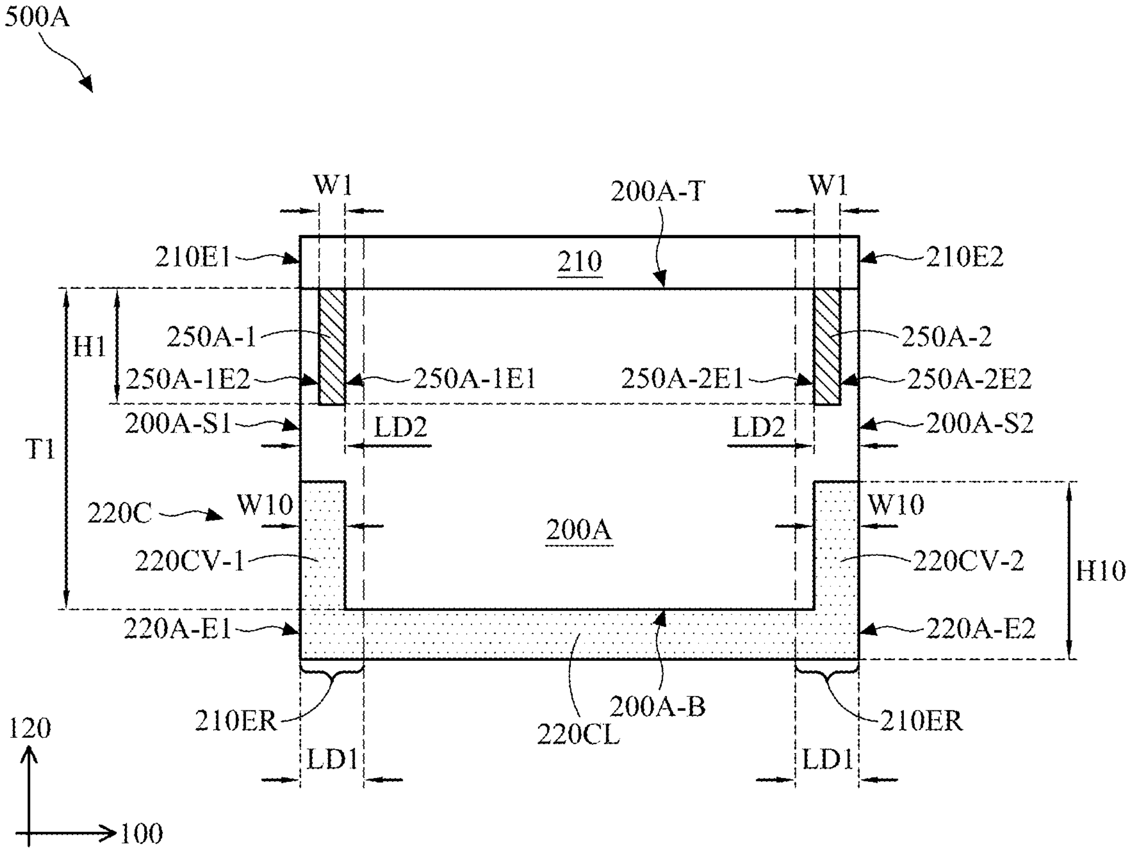
FIG. 15 is a cross-sectional view taken along the line A-A' of the antenna shown in FIG. 1A in accordance with some embodiments of the disclosure.

FIG. 15 is another cross-sectional view taken along the line A-A' of the antenna 500A of FIGS. 1A and 1B in accordance with some embodiments of the disclosure, showing the arrangement of embedded conductive feature 250A and a grounding layer 220C of the antenna 500A. In some embodiments as shown in FIGS. 1A and 15, the antenna 500A includes an antenna substrate 200A, an antenna layer 210, the grounding layer 220C and the conductive features 250A-1 and 250A-2.

In a cross-sectional view as s shown in FIG. 15, the grounding layer 220C may be U-shape. The grounding layer 220C may have a lateral portion 220CL and protruding portions 220CV-1, 200CV-2 connected to opposite ends the lateral portion 220CL. In some embodiments, the lateral portion 220CL of the grounding layer 220C is disposed on the bottom surface 200A-B of the antenna substrate 200A. The protruding portions 220CV-1, 200CV-2 of the grounding layer 220C may extend into a portion of the antenna substrate 200A along the direction 120. In addition, the protruding portions 220CV-1, 200CV-2 of the grounding layer 220C may extend toward the conductive features 250A-1 and 250A-2.

In some embodiments, the protruding portions 220CV-1, 200CV-2 of the grounding layer 220C may be embedded in the antenna substrate 200A and close to the three corresponding edges 210E1 and 210E2 of the antenna layer 210. In some embodiments, the protruding portions 220CV-1, 200CV-2 of the grounding layer 220C may be formed inside the antenna substrate 200A and are not exposed from the corresponding side surfaces 200A-S1 and 200A-S2 of the antenna substrate 200A. In some embodiments, the protruding portions 220CV-1, 200CV-2 of the grounding layer 220C may be exposed from the corresponding side surfaces 200A-S1 and 200A-S2 of the antenna substrate 200A.

In some embodiments, the conductive features 250A-1 and 250A-2 may completely overlap the protruding portions 220CV-1, 220CV-2 in the direction 120. The length (not shown) of the protruding portions 220CV-1, 220CV-2 may be equal to the length L1 of the corresponding conductive features 250A-1 and 250A-2 in the top view shown in FIG. 1A.

In some embodiments, the protruding portions 220CV-1, 220CV-2 of the grounding layer 220C have the same height H10. The total of the height H1 of the conductive features 250A-1 (or the conductive feature 250A-2) and the height H10 of the corresponding protruding portions 220CV-1 (or the protruding portion 220CV-2) may be less than the thickness T1 of the antenna substrate 200A. If the total of the height H1 and the height H10 is equal to the thickness T1 of the antenna substrate 200A, the conductive features 250A may be in contact with the grounding layer 220C and affect the performance of the antenna 500A.

The protruding portions 220CV-1, 220CV-2 of the grounding layer 220C may have the same width W10. In some embodiments, the width W10 is less than or equal to 0.1 λg, wherein λg is the guided wavelength of 50Ω microstrip at the center frequency.

It is appreciated that although some features are shown in some embodiments but not in other embodiments, these features may (or may not) exist in other embodiments whenever possible. For example, although the illustrated example embodiments of FIG. 15 shows the specific structure of the grounding layer 220C of the antenna 500A, any other combinations of the structure of the conductive feature may also be used whenever applicable. In addition, the grounding layer 220C of the antenna 500A shown in FIG. 15 may be implemented in the grounding layer of the antennas 500B to 500I, and 500K to 500M whenever applicable.

Figure 16A:
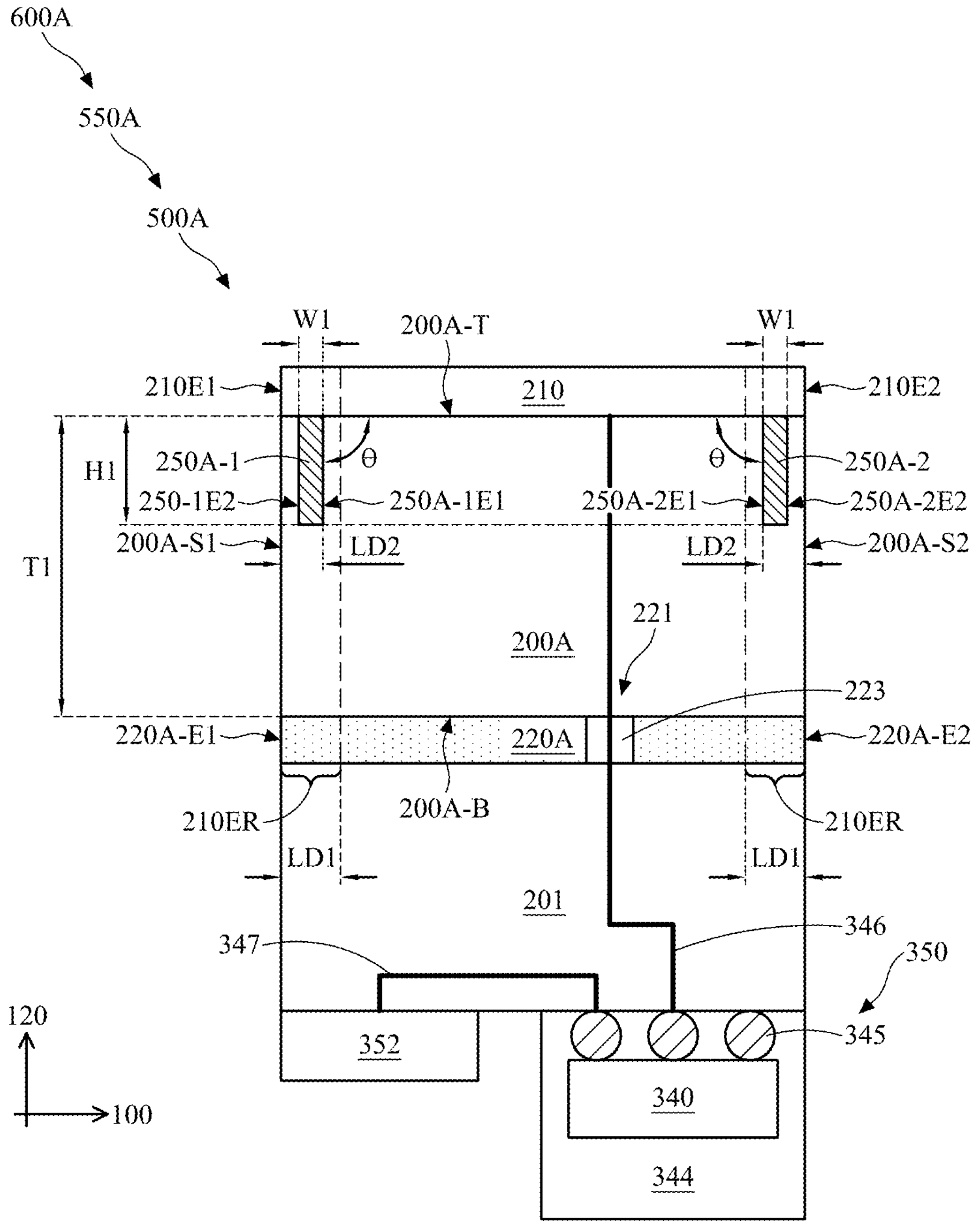
FIG. 16A is a cross-sectional view of an antenna package including an antenna in accordance with some embodiments of the disclosure.

FIG. 16A is a cross-sectional view of an antenna package 600 including an antenna 550A in accordance with some embodiments of the disclosure. Elements of the embodiments hereinafter, that are the same or similar as those previously described with reference to FIGS. 1A, 1B to 15, are not repeated for brevity. In some embodiments, the antenna package 600A includes an antenna 550A, a first substrate 201 and a semiconductor die 340. In some embodiments, the antenna 550A of the antenna package 600A may be composed of any of the antennas 500A, 500B, 500C, 500D, 500E, 500F, 500G, 500H, 500I, 500K, 500L and 500M. In some embodiments as shown in FIG. 16A, the antenna 550A may be composed of the antenna 500A as shown in FIGS. 1A and 1B. The first substrate 201 is mounted on the grounding layer 220A of the antenna 550A (or the antenna 500A). In addition, the semiconductor die 340 is mounted on the first substrate 201.

In the antenna 550A, the antenna layer 210 is disposed on the top surface 200A-T of the antenna substrate 200A. The grounding layer 220A is disposed on the bottom surface 200A-B of the antenna substrate 200A. The conductive features 250A-1 and 250A-2 are embedded in the antenna substrate 200A and close to the corresponding edges 210E1 and 210E2 of the antenna layer 210. The conductive features 250A-1 and 250A-2 and the grounding layer 220A are spaced apart by a part of the antenna substrate 200A. Each of the conductive features 250A-1 and 250A-2 includes a first portion. In some embodiments, each of the conductive features 250A-1 and 250A-2 may only have the first portion. The angle θ between the first portion (i.e., the conductive feature 250A-1 or 250A-2) and the top surface 200A-T of the antenna substrate 200A is greater than 0 degrees and less than 180 degrees.

As shown in FIG. 16A, the first substrate 201 is mounted on the grounding layer 220A and opposite to the antenna substrate 200A. In some embodiments, the antenna substrate 200A is integrated with the first substrate 201, and the grounding layer 220A is formed between the antenna substrate 200A and the first substrate 201. In some embodiments, the antenna substrate 200A and the first substrate 201 may have the same or similar material, structure and process.

In some embodiments, the antenna package 600A further includes an electronic module 350, a connecting line 346, an electrical routing 347 of the first substrate 201 and an input/output (I/O) connector 352.

The electronic module 350 is mounted on the first substrate 201 and opposite to the grounding layer 220A. In some embodiments, the electronic module 350 includes the semiconductor die 340, a molding compound 344 and at least one conductive bump structure 345. The semiconductor die 340 is electrically connected to the antenna layer 210 through the connecting line 346. In some embodiments, the connecting line 346 is formed by the electrical routings of the antenna substrate 200A and the first substrate 201. In some embodiments, the connecting line 346 is formed passing through the antenna substrate 200A, a through hole 221 of the grounding layer 220A and the first substrate 201. In addition, the through hole 221 is filled with a dielectric material 223 that is the same or similar to the dielectric material of the antenna substrate 200A and the first substrate 201. Therefore, a portion of the connecting line 346 passing through the through hole 221 may be spaced apart from the grounding layer 220A by the dielectric material 223. As shown in FIG. 16A, the semiconductor die 340 is electrically connected to the connecting line 346 through the conductive bump structures 345. In some embodiments, the semiconductor die 340 is, for example, a radio frequency (RF) die.

The molding compound 344 is formed on and in contact with a portion of the first substrate 201 and opposite to the grounding layer 220A. The molding compound 344 covers and encapsulates the semiconductor die 340 but not covers the I/O connector 352. In some embodiments, the molding compound 344 is made of a material including, for example, a Novolac-based resin, an epoxy-based resin, a silicone-based resin, or another suitable encapsulant. The molding compound 344 may include suitable fillers, such as powdered $SiO_2$. The molding compound 344 can be applied using any of a number of molding techniques, such as compression molding, injection molding, or transfer molding.

The I/O connector 352 is mounted on the first substrate 201 and opposite to the grounding layer 220A. In addition, the I/O connector 352 is located beside the electronic module 350. In addition, the I/O connector 352 may be electrically connected to the electronic module 350 through the electrical routing 347. In some embodiments, the connecting line 346 and the electrical routing 347 are connected to the different conductive bump structures 345. Moreover, the I/O connector 352 may be electrically connected to a modem (not illustrated) by a flexible connector (e.g., flexible printed circuits, FPCs) (not illustrated).

Figure 16B:
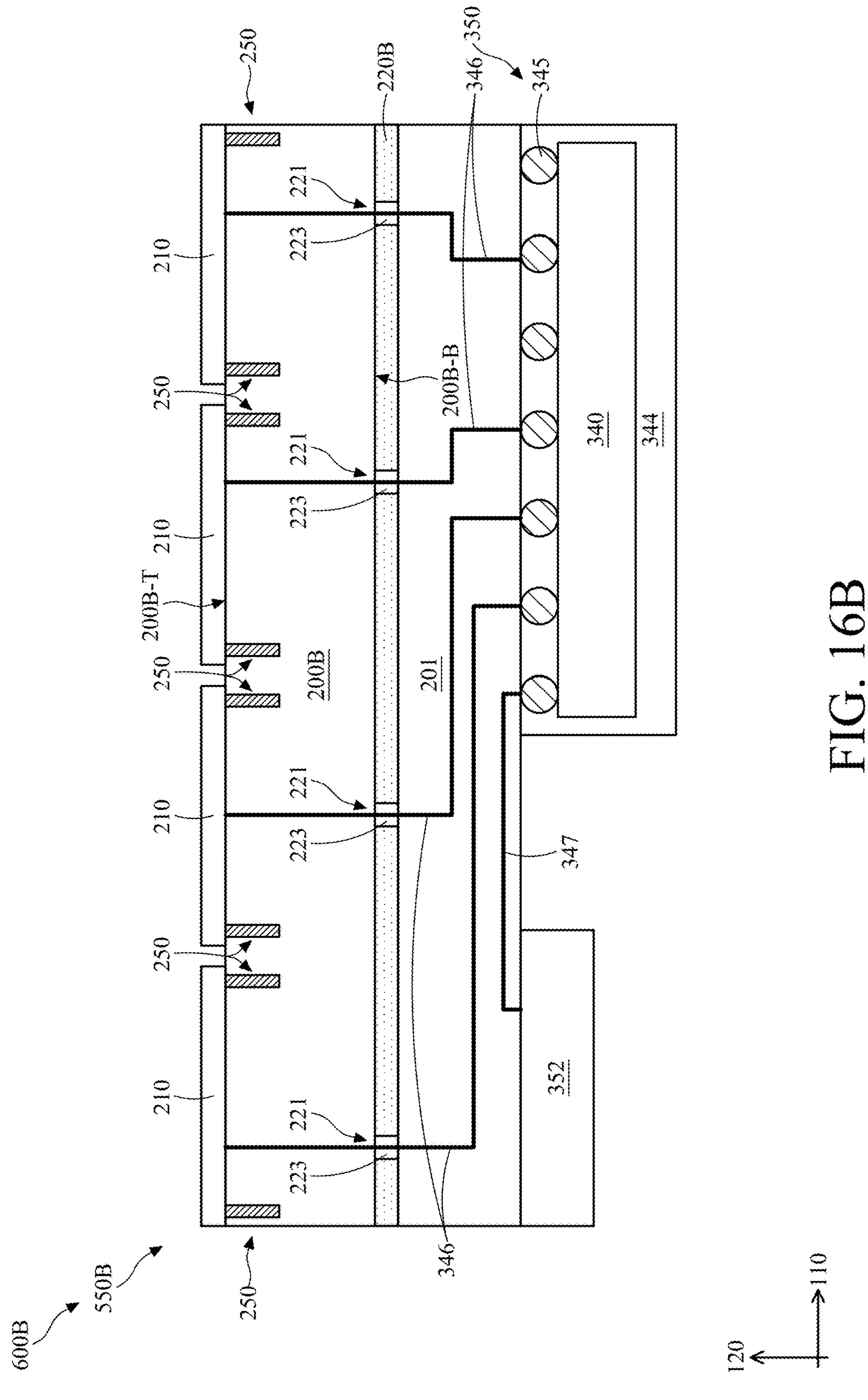
FIG. 16B is a cross-sectional view of an antenna package including an antenna in accordance with some embodiments of the disclosure.

FIG. 16B is a cross-sectional view of an antenna package 600B including an antenna 550B in accordance with some embodiments of the disclosure. Elements of the embodiments hereinafter, that are the same or similar as those previously described with reference to FIGS. 1A, 1B to 16A, are not repeated for brevity. As shown in FIG. 16B, the difference between the antenna package 600B and the antenna package 600A is that the antenna package 600B includes four the antenna layers 210 and the corresponding connecting lines 346. It is noted that the number of the antenna layers 210 is not limited to the disclosed embodiment. The antenna package 600B includes an antenna 550B, the first substrate 201 and the semiconductor die 340. In some embodiments, the antenna 550B of the antenna package 600B may include the antenna substrate 200B, the antenna layers 210, the grounding layer 220B, and the conductive features 250. The first substrate 201 is mounted on the grounding layer 220B of the antenna 550B. In addition, the semiconductor die 340 is mounted on the first substrate 201.

In the antenna 550B, the antenna layers 210 are disposed on and partially cover the top surface 200B-T of the antenna substrate 200B. In addition, the antenna layers 210 are separated from each other. The grounding layer 220B is disposed on and completely covers the bottom surface 200B-B of the antenna substrate 200B. The conductive features 250 are embedded in the antenna substrate 200B and close to the corresponding edges of the corresponding antenna layers 210. The conductive features 250 may be composed of any of the conductive features 250A, 250A-1, 250A-2, 250A-3, 250A-3, 250F-1, 250F-2, 250G-1, 250G-2, 250H-1, 250H-2, 250H-3, 250I-1, 250I-2, 250I-3, 250K-1, 250K-2, 250K-3, 250L-1, 250L-2, 250M-1, 250M-2 shown in the previously figures.

The semiconductor die 340 is electrically connected to the different antenna layers 210 through the different connecting lines 346. In some embodiments, the connecting lines 346 are formed passing through the antenna substrate 200A, the corresponding through holes 221 of the grounding layer 220A and the first substrate 201. In addition, each of the through holes 221 is filled with the dielectric material 223 that is the same or similar to the dielectric material of the antenna substrate 200A and the first substrate 201. Therefore, portions of the connecting lines 346 passing through the corresponding through holes 221 may be spaced apart from the grounding layer 220A by the dielectric material 223. In some embodiments, the different connecting lines 346 are connected to the different conductive bump structures 345. In some other embodiments (e.g., the radar applications), the different connecting lines 346 are connected to the same conductive bump structure 345.

In some embodiments, the connecting lines 346 and the electrical routing 347 are connected to the different conductive bump structures 345.

Figure 17A:
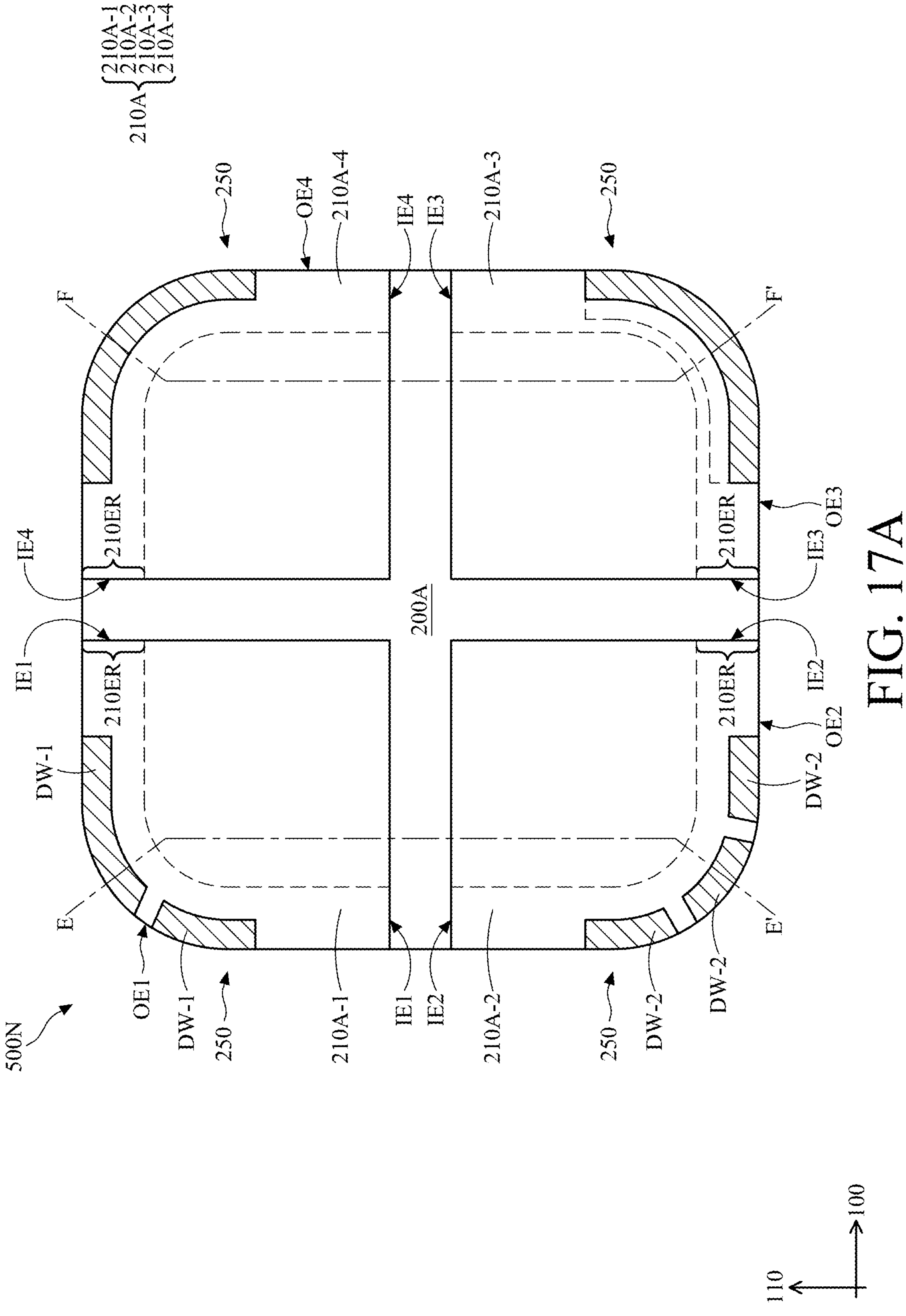
FIG. 17A is a top view of an antenna in accordance with some embodiments of the disclosure.
Figure 17B:
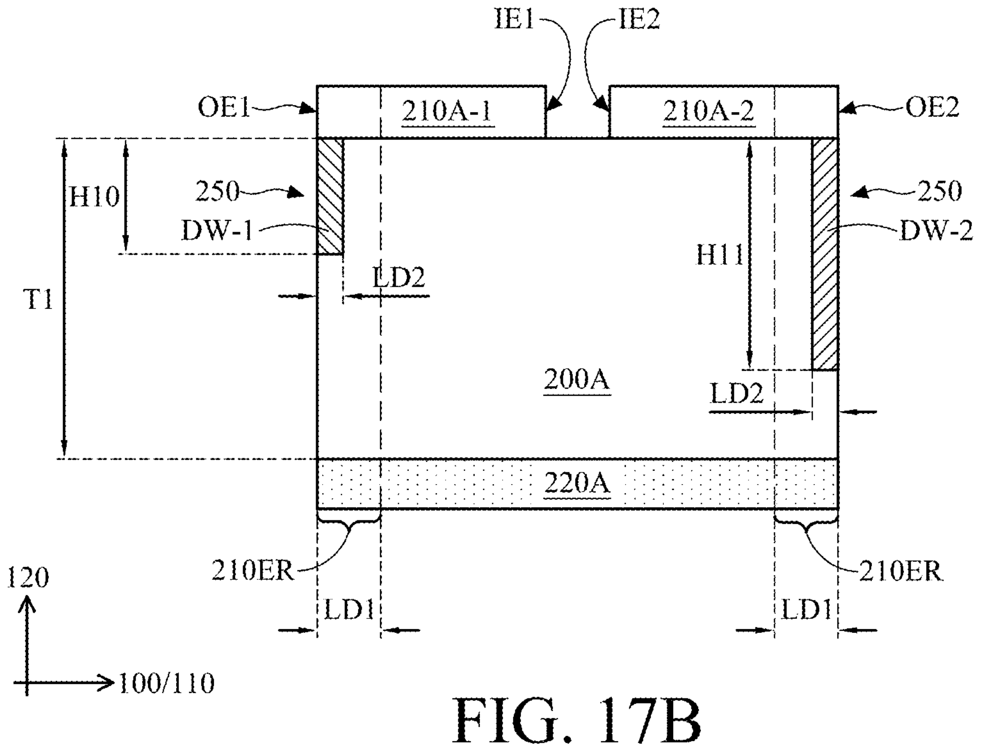
FIG. 17B is a cross-sectional view taken along the line E-E' of the antenna shown in FIG. 17A in accordance with some embodiments of the disclosure.
Figure 17C:
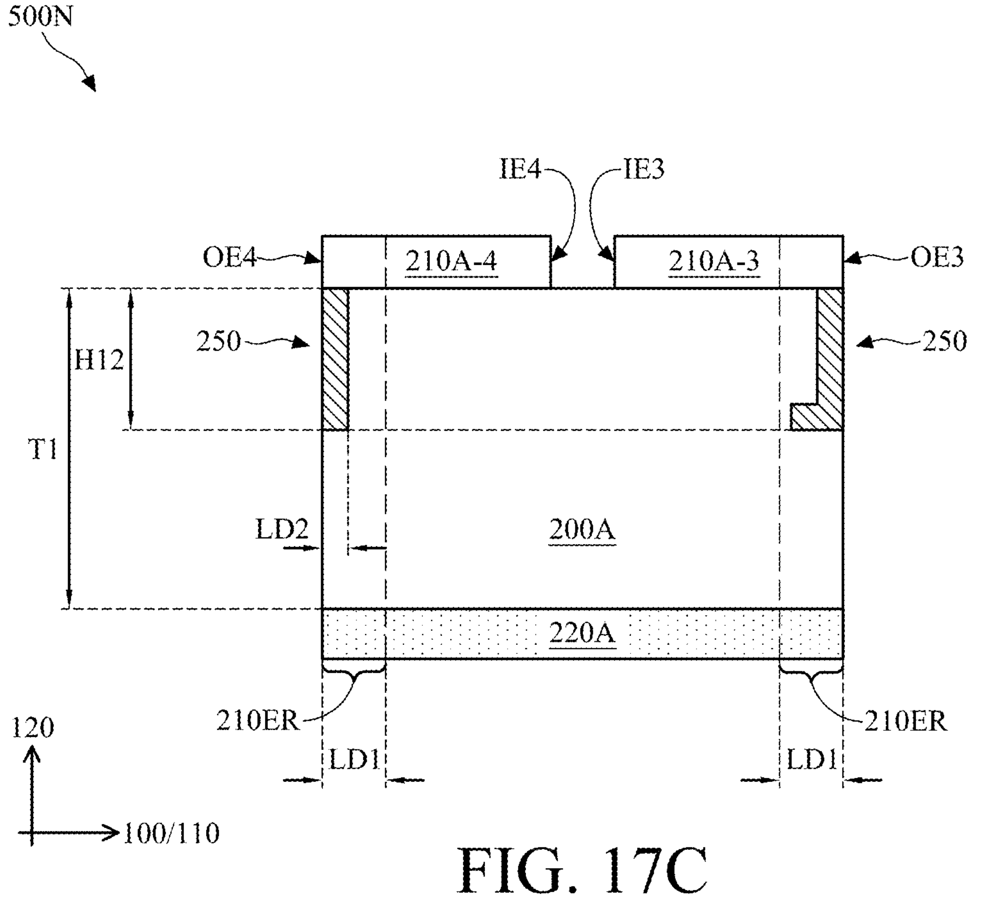
FIG. 17C is a cross-sectional view taken along the line F-F' of the antenna shown in FIG. 17A in accordance with some embodiments of the disclosure.

FIG. 17A is a top view of an antenna 500N in accordance with some embodiments of the disclosure, showing the arrangement of an antenna layer 210A. FIG. 17B is a cross-sectional view taken along the line E-E' of the antenna 500N shown in FIG. 17A in accordance with some embodiments of the disclosure. FIG. 17C is a cross-sectional view taken along the line F-F' of the antenna 500N shown in FIG. 17A in accordance with some embodiments of the disclosure. Elements of the embodiments hereinafter, that are the same or similar as those previously described with reference to FIGS. 1A, 1B to 16A, 16B, are not repeated for brevity.

As shown in FIGS. 17A-17C, the antenna 500N includes an antenna layer 210A, the antenna substrate 200A, the grounding layer 220A and the conductive features 250. In some embodiments, the antenna layer 210A is composed of four petal-like portions 210A-1, 210A-2, 210A-3 and 210A-4 separated from each other. In addition, the petal-like portions 210A-1, 210A-2, 210A-3 and 210A-4 may jointly function as a plurality of dipoles. It is noted that the antenna layer 210A may have various the top view shapes, such as a circular shape or a rectangular shape, and not limited to the disclosed embodiments.

In some embodiments, the conductive features 250 are arranged close to outer edges OE-1, OE-2, OE-3, and OE-4 of the corresponding petal-like portions 210A-1, 210A-2, 210A-3 and 210A-4. It is noted that the conductive features 250 are not allowed to be arranged close to inner edges IE-1, IE-2, IE-3, and IE-4 of the corresponding petal-like portions 210A-1, 210A-2, 210A-3 and 210A-4. In some embodiments, the conductive features 250 may be composed of any combination of the conductive features 250A, 250A-1, 250A-2, 250A-3, 250A-3, 250F-1, 250F-2, 250G-1, 250G-2, 250H-1, 250H-2, 250H-3, 250I-1, 250I-2, 250I-3, 250K-1, 250K-2, 250K-3, 250L-1, 250L-2, 250M-1, 250M-2 shown in the previously figures.

In some embodiments, the conductive features 250 arranged close to outer edges OE-1, OE-2, OE-3, OE-4 may have the same or different structures (e.g., a single wall structure or discrete wall structures), geometric dimension (e.g., the shape, the length, the width or the height).

In some embodiments as shown in FIGS. 17A and 17B, the conductive features 250 located close to the outer edges OE-1 and OE-2 may be formed of discrete wall structures having different heights in the direction 120. For example, the conductive features 250 located close to the outer edge OE-1 include discrete wall structures DW-1 arranged side-by-side. In addition, the conductive features 250 located close to the outer edge OE-2 include discrete wall structures DW-2 arranged side-by-side. In some embodiments, the discrete wall structures DW-1 may have a height H10, and the discrete wall structures DW-2 may have a height H11 in the direction 120 and less than the thickness T1 of the antenna substrate 200A. In some embodiments, the height H10 of discrete wall structures DW-1 is different from the height H11 of the discrete wall structures DW-2. For example, the height H11 may be greater than the height H10. In some embodiments, the discrete wall structures DW-1 corresponding to the same petal-like portion 210A-1 of the antenna layer 210A may have different heights in the direction 120. Similarly, the discrete wall structures DW-2 corresponding to the same petal-like portion 210A-2 of the antenna layer 210A may have different heights in the direction 120.

In some embodiments as shown in FIGS. 17A and 17C, the conductive features 250 located close to the outer edges OE-3 and OE-4 are single wall structures continuously extending along the corresponding the outer edges OE-3 and OE-4 of the antenna layer 210A. The conductive features 250 located close to the outer edges OE-3 and OE-4 may have different cross-sectional shapes. For example, as shown in FIG. 17C, the conductive feature 250 located close to the outer edge OE-3 is reversed L-shape and has a vertical portion (or the first portion) and a lateral portion connected to the vertical portion. In addition, the conductive feature 250 located close to the outer edge OE-4 is I-shape and only have a vertical portion (or the first portion). In some embodiments, the conductive features 250 located close to the outer edges OE-3 and OE-4 may have the same height H12 in the direction 120 and less than the thickness T1 of the antenna substrate 200A. In some embodiments, the conductive features 250 located close to the outer edges OE-3 and OE-4 may have different heights in the direction 120.

Figure 18:
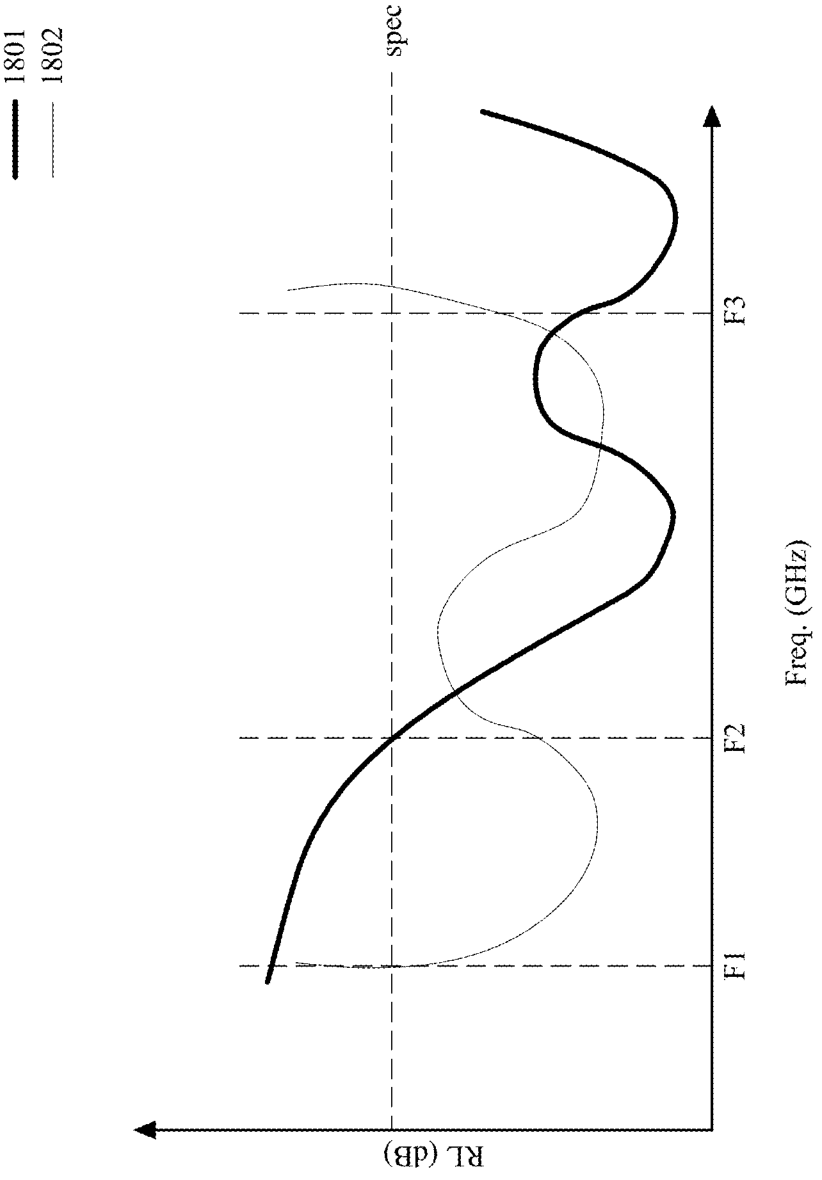
FIG. 18 is a diagram showing a comparison of return loss versus operation frequency between the conventional antenna and an antenna in accordance with some embodiments of the disclosure.

FIG. 18 is a diagram showing a comparison of return loss (RL (dB)) versus operation frequency (Freq. (GHz)) between the conventional antenna (e.g., the conventional 5G millimeter-wave (mmWave) antenna-in-package (AiP)) and the antenna in accordance with some embodiments of the disclosure. In FIG. 18, the curve 1801 shows the return loss versus operation frequency of the conventional antenna in which the grounding layer is comparable with the antenna layer. The curve 1802 shows the return loss versus operation frequency of the antenna (including the antennas 500A, 500B, 500C, 500D, 500E, 500F, 500G, 500H, 500I, 500K, 500L, 500M and 500N) in accordance with some embodiments of the disclosure. In addition, the frequency band between the frequencies F1 and F3 is the concerned frequency band of the antenna. The frequency band lower than the frequency F1 or higher than the frequency F3 is not the concerned frequency band of the antenna. It can be seen from the curve 1801 that the operation frequency of the conventional antenna shifts to higher frequency band (e.g., the frequency F3). The performance of the conventional antenna is impacted at lower frequency band (e.g., the frequency F1 and the frequency F2). It can be seen from the curves 1801 and 1802 that compared to the conventional antenna, the operation frequency of the antenna in accordance with some embodiments of the disclosure including the embedded conductive feature (including the conductive features 250A, 250A-1, 250A-2, 250A-3, 250A-3, 250F-1, 250F-2, 250G-1, 250G-2, 250H-1, 250H-2, 250H-3, 250I-1, 250I-2, 250I-3, 250K-1, 250K-2, 250K-3, 250L-1, 250L-2, 250M-1, 250M-2) will shift to lower frequency band (e.g., the frequency F2). The performance of the antenna at lower frequency band can be improved obviously.

Embodiments provide an antenna. The antenna includes an antenna substrate, an antenna layer, a grounding layer and a conductive feature. The antenna layer is disposed on the top surface of the antenna substrate. The antenna layer has a first edge close to the first side surface of the antenna substrate. The grounding layer is disposed on the bottom surface of the antenna substrate. The conductive feature is embedded in the antenna substrate and close to the first edge of the antenna layer. The first conductive layer extends toward the grounding layer and is electrically connected to the antenna layer.

The embedded conductive features may serve as an extended portion of the antenna layer to reduce the distance between the antenna layer and the grounding layer. Therefore, shunt capacitance of the antenna is increased. The performance of the antenna at lower frequency band can be improved obviously. In addition, the antenna and the conductive feature can be fabricated during the printed circuit board (PCB) fabrication process. The conductive feature may be formed without additional plating process performed after the fabrication of the antenna. Therefore, the manufacturing cost can be reduced.

In some embodiments, the conductive feature may extend along the corresponding edge of the antenna layer. In the top view, the length (e.g., the length L1) of the conductive feature may be less than or equal to the length (e.g., the length L2) of the corresponding edge of the antenna layer. In the cross-sectional view, the conductive features may extend toward the grounding layer. The height (e.g., the height H1) of the conductive feature may be less than the thickness (e.g., the thickness T1) of the antenna substrate.

In the top view, the conductive feature may be arranged within the edge region of the antenna layer. In some embodiments, the lateral distance (e.g., the lateral distance LD1) of the edge region is less than or equal to 0.1 $\lambda g$, wherein $\lambda g$ is the guided wavelength of 50Ω microstrip at the center frequency. Accordingly, the width (e.g., the width W1) of the conductive feature is less than or equal to 0.1 $\lambda g$.

In some embodiments, the antenna layer may completely or partially cover the top surface of the antenna substrate. The conductive feature may be formed inside the antenna substrate or exposed from the corresponding side surface of the antenna substrate.

In some embodiments, the conductive features include a single wall structure continuously extends parallel to the corresponding edge of the antenna layer. The number of the conductive features having the single wall structure may be less than or equal to the number of the edges of the antenna layer. In some embodiments, the conductive feature having the single wall structure and the corresponding edge of the antenna layer may be in a one-to-one relationship. In some embodiments, the conductive features having the single wall structure have the same or different heights along the first direction substantially perpendicular to the top surface of the antenna substrate in a cross-sectional view.

In some embodiments, the conductive feature includes discrete wall structures arranged side-by-side and close to the corresponding edge of the antenna layer. In some embodiments, the discrete wall structures are separated from each other and arranged in a row along the corresponding edge of the antenna layer. In some embodiments, the discrete wall structures and the corresponding edge of the antenna layer may be in a many-to-one relationship. In some embodiments in which the conductive feature includes discrete wall structures, the discrete wall structures have the same or different heights along the first direction in a cross-sectional view.

In some embodiments, the conductive features corresponding to the same antennal layer may have various shapes (e.g., strip shape, L-shape, inverted L-shape, reversed L-shape or reverse inverted L-shape) of the same or different heights in the cross-sectional view to increase shunt capacitance and provide increased design flexibility.

In some embodiments, the conductive feature includes an integrated wall structure by metal slug technique of low temperature co-fired ceramic (LTCC) printed circuit board (PCB) fabrication process. In some embodiments, the conductive feature includes a composite wall structure formed by buried hole technique of printed circuit board (PCB) fabrication process.

In some embodiments, the conductive feature may be in contact with the antenna layer. In some embodiments, the conductive feature may be disposed separated from the antenna layer. The conductive feature may be electrically coupled to the antenna layer to increase shunt capacitance and provide increased design flexibility.

In some embodiments, the grounding layer of the antenna may have a protruding portion that extends toward the conductive feature to further increase the shunt capacitance and provide increased design flexibility.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna, comprising:

an antenna substrate having a top surface, and a bottom surface opposite to the top surface;

an antenna layer disposed on the top surface of the antenna substrate;

a grounding layer disposed on the bottom surface of the antenna substrate;

a first conductive feature embedded in the antenna substrate and close to a first edge of the antenna layer, wherein the first conductive feature and the grounding layer are spaced apart by a part of the antenna substrate, and the first conductive feature comprises an extending portion, wherein an angle between the extending portion or an extended line of the extending portion and the top surface of the antenna substrate is greater than 0 degree and less than 180 degrees;

a first substrate mounted on the grounding layer of the antenna; and a radio frequency (RF) semiconductor die mounted on the first substrate, wherein the RF semiconductor die is electrically coupled to the antenna layer through a connecting line.

2. The antenna as claimed in claim 1, wherein the area of a top surface of the antenna layer is equal to or less than the area of the top surface of the antenna substrate, and wherein the top surface of the antenna layer is adjacent to the top surface of the antenna substrate.

3. The antenna as claimed in claim 1, wherein the first conductive feature has a first height along a first direction that substantially vertical to the top surface of the antenna substrate, the first height is less than a thickness of the antenna substrate along the first direction.

4. The antenna as claimed in claim 1, wherein the first conductive feature has an inner edge away from the first edge of the antenna layer, and wherein a first lateral distance between the inner edge of the first conductive feature and the first edge of the antenna layer is less than or equal to 0.1 $\lambda g$, wherein $\lambda g$ is the guided wavelength of 50Ω microstrip at the center frequency.

5. The antenna as claimed in claim 4, wherein the first conductive feature has an outer edge close the first edge of the antenna layer and opposite the inner edge, and wherein the first conductive feature has a width between the inner edge and the outer edge of less than or equal to 0.1 $\lambda g$.

6. The antenna as claimed in claim 1, wherein the first conductive feature is a single wall structure continuously extending parallel to the first edge of the antenna layer.

7. The antenna as claimed in claim 6, wherein the first conductive feature and the corresponding edge of the antenna layer is in a one-to-one relationship.

8. The antenna as claimed in claim 1, wherein the first conductive feature comprises discrete wall structures arranged side-by-side corresponding to the first edge of the antenna layer.

9. The antenna as claimed in claim 8, wherein the first conductive feature and the corresponding edge of the antenna layer is in a many-to-one relationship.

10. The antenna as claimed in claim 8, wherein the discrete wall structures have different heights along the first direction.

11. The antenna as claimed in claim 1, wherein the first conductive feature has a strip shape, an L-shape, an inverted L-shape, a reversed L-shape, or a reverse inverted L-shape.

12. The antenna as claimed in claim 1, wherein the first conductive feature has a lateral portion close to the bottom surface of the antenna substrate, and wherein the lateral portion extends toward a central portion of the antenna substrate and substantially parallel to the antenna layer.

13. The antenna as claimed in claim 1, wherein the first conductive feature comprises an integrated wall structure or a composite wall structure.

14. The antenna as claimed in claim 13, wherein the composite wall structure comprises:

vias arranged in a row corresponding to the first edge of the antenna layer; and a conductive line covering and electrically connected to the vias.

15. The antenna as claimed in claim 1, wherein the first conductive feature is in contact with the antenna layer.

16. The antenna as claimed in claim 1, wherein the first conductive feature is separated from and electrically coupled to the antenna layer.

17. The antenna as claimed in claim 16, wherein the first conductive feature is electrically floating.

18. The antenna as claimed in claim 16, wherein the first conductive feature has a first height along a first direction that substantially vertical to the top surface of the antenna substrate, and a distance between the antenna layer and the conductive feature is less than the first height.

19. The antenna as claimed in claim 1, further comprising:

a second conductive feature embedded in the antenna substrate and close to a second edge of the antenna layer close to the second side surface, wherein the second conductive layer is electrically connected to the antenna layer.

20. The antenna as claimed in claim 1, wherein the grounding layer has a protruding portion that extends toward the first conductive feature.

* * * * *